United States Patent
Ogawa et al.

(10) Patent No.: US 8,914,193 B2
(45) Date of Patent: Dec. 16, 2014

(54) DAMPING FORCE CONTROL APPARATUS

(75) Inventors: Atsushi Ogawa, Nagoya (JP); Motohiko Honma, Toyota (JP); Koutaro Okimura, Toyota (JP); Taisuke Hayashi, Toyota (JP); Takahito Watanabe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 647 days.

(21) Appl. No.: 13/202,879

(22) PCT Filed: Feb. 23, 2009

(86) PCT No.: PCT/JP2009/053781
§ 371 (c)(1),
(2), (4) Date: Nov. 7, 2011

(87) PCT Pub. No.: WO2010/095278
PCT Pub. Date: Aug. 26, 2010

(65) Prior Publication Data
US 2012/0046829 A1 Feb. 23, 2012

(51) Int. Cl.
*B60G 17/08* (2006.01)
*B60G 17/018* (2006.01)
*B60G 17/016* (2006.01)

(52) U.S. Cl.
CPC ........ *B60G 17/016* (2013.01); *B60G 2800/916* (2013.01); *B60G 2600/187* (2013.01); *B60G 2202/24* (2013.01); *B60G 2400/206* (2013.01); *B60G 2600/184* (2013.01); *B60G 2400/202* (2013.01); *B60G 17/08* (2013.01); *B60G 17/018* (2013.01); *B60G 2400/102* (2013.01); *B60G 2400/91* (2013.01); *B60G 2800/162* (2013.01); *B60G 2500/102* (2013.01); *B60G 2400/252* (2013.01)
USPC .......................................................... 701/37

(58) Field of Classification Search
None
See application file for complete search history.

(56) References Cited

U.S. PATENT DOCUMENTS 6,243,631 * 6/2001 Ohsaku ............................ 701/37
6,314,353 B1 * 11/2001 Ohsaku et al. .................. 701/37

(Continued)

FOREIGN PATENT DOCUMENTS

| JP | 5-24426 | 2/1993 |
| JP | 7 117443 | 5/1995 |

(Continued)

OTHER PUBLICATIONS

International Search Report Issued Apr. 14, 2009 in PCT/JP09/053781 filed Feb. 23, 2009.

*Primary Examiner* — John R Olszewski
*Assistant Examiner* — James M McPherson
(74) *Attorney, Agent, or Firm* — Oblon, Spivak, McClelland, Maier & Neustadt, L.L.P.

(57) ABSTRACT

The magnitude of a linear damping coefficient $C_s$ is set so as to decrease the greater a maximum amplitude value $\alpha$ of an intermediate frequency sprung acceleration is. In the case where a damping force control apparatus carries out control for dampening vibrations of a sprung member using a non-linear H-infinity control theory, the linear damping coefficient $C_s$ is set to a high value when the maximum amplitude value $\alpha$ of the intermediate frequency sprung acceleration inputted to a suspension apparatus is low. Accordingly, a requested damping force $F_{req}$ also increases, which makes it possible to quickly dampen vibrations in the sprung member. Meanwhile, in the case where the maximum amplitude value $\alpha$ of the intermediate frequency sprung acceleration is high, the linear damping coefficient $C_s$ is set to a low value. Accordingly, the requested damping force $F_{req}$ also decreases, which makes it possible to suppress degradation in the riding quality when intermediate frequency vibrations are inputted, and particularly makes it possible to suppress riding quality degradation when the vibration speed is high.

10 Claims, 26 Drawing Sheets

(56) References Cited

U.S. PATENT DOCUMENTS

| | | |
|---|---|---|
| 6,366,841 B1 * 4/2002 | Ohsaku | 701/37 |
| 8,560,171 B2 * 10/2013 | Hozumi | 701/37 |
| 8,598,831 B2 * 12/2013 | Ogawa et al. | 318/611 |
| 8,718,872 B2 * 5/2014 | Hirao et al. | 701/38 |
| 8,744,681 B2 * 6/2014 | Liu et al. | 701/38 |
| 2008/0004770 A1 * 1/2008 | Masamura | 701/37 |

FOREIGN PATENT DOCUMENTS

| | | |
|---|---|---|
| JP | 7-276954 | 10/1995 |
| JP | 8 58338 | 3/1996 |
| JP | 2001 1736 | 1/2001 |
| JP | 2006 160185 | 6/2006 |
| JP | 3787038 | 6/2006 |

* cited by examiner

DAMPING FORCE CONTROL APPARATUS

BACKGROUND OF THE INVENTION

1. Technical Field

The present invention relates to damping force control apparatuses that control damping forces in vehicle suspension apparatuses.

2. Related Art

Vehicle suspension apparatuses include dampers and springs interposed between an sprung member (above-spring member) such as a vehicle body and unsprung members (below-spring members) such as lower arms linked to wheels. Suspension apparatuses configure a vibration system. Furthermore, suspension apparatuses function so as to dampen vibrations of the sprung member by damping forces generated by the dampers.

Damping force control apparatus, which controls the damping forces generated by the dampers to dampen various types of vibrations in the sprung member can be dampened, is known. The damping force control apparatus carries out damping control of vibrations in the sprung member by using a predetermined control theory such as Skyhook control, nonlinear H-infinity control, and so on.

Japanese Patent Application Publication No. 2001-1736 discloses a damping force control apparatus that controls a damping force generated by a damper by applying nonlinear H-infinity control to a control system which is designed based on the motion of a suspension apparatus expressed by a single-wheel model. This damping force control apparatus calculates a variable damping coefficient by solving a nonlinear H-infinity control problem. Notably, the variable damping coefficient represents a coefficient of a variable damping force relative to the vibration speed. The variable damping force is a variable component (nonlinear component) obtained by removing a linear component that changes linearly relative to the vibration speed (a linear damping force) from the total damping force generated by the damper. Furthermore, this damping force control apparatus calculates a requested damping force, which is a target damping force to be generated by the damper for control, based on a requested damping coefficient. The requested damping coefficient is obtained by adding the variable damping coefficient calculated as described above and a linear damping coefficient, which is a coefficient of the linear damping force relative to the vibration speed. The damping force characteristic of the damper is then controlled based on the calculated requested damping force.

SUMMARY OF THE INVENTION

FIG. 27 is a graph showing a damping force characteristic by which a transition of the requested damping force calculated by applying the nonlinear H-infinity control theory is represented. The horizontal axis in the graph represents a vibration speed (this speed is a relative speed in the vertical direction between an sprung member and an unsprung member (sprung-unsprung relative speed)) V, and the vertical axis represents a damping force F. As can be seen in the graph, a requested damping force $F_{req}$ is calculated by adding a variable damping force $F_v$, calculated by multiplying a variable damping coefficient $C_v$ by a vibration speed $V_1$, to a linear damping force $F_s$, calculated by multiplying a linear damping coefficient $C_s$ by the vibration speed $V_1$. The requested damping force $F_{req}$ fluctuates as the variable damping force $F_v$ fluctuates. Accordingly, the transition of the requested damping force $F_{req}$ is expressed as a smooth Lissajous curve that follows fluctuations in the variable damping force $F_v$, as shown in the graph.

This Lissajous curve is drawn so as to have a predetermined bulge which spreads from a central focus on a line of the damping force characteristic expressed by the linear damping coefficient $C_s$. The average slope of the Lissajous curve is affected by the linear damping coefficient $C_s$. Meanwhile, the magnitude of the bulge in the Lissajous curve is affected by a nonlinear weight β, which is exerted on an evaluation output of the control system (generalized plant) to which the nonlinear H-infinity control is applied. In other words, the linear damping coefficient $C_s$ and the nonlinear weight β affect the shape of the Lissajous curve. The linear damping coefficient $C_s$ and the nonlinear weight β are set by a designer in advance so that the Lissajous curve falls within the range of variation for the damping characteristic of the damper, or in other words, falls within the range between a characteristic expressing the maximum damping force generated by the damper (a damping force characteristic line expressed by $D_{max}$) and a characteristic expressing the minimum damping force generated by the damper (a damping force characteristic line expressed by $D_{min}$) (that is, the range indicated in the graph by R).

Vibration of the sprung member, particularly vibration having a frequency in the vicinity of a sprung member resonation frequency (approximately 1 Hz), is dampened more quickly as the damping force is greater. Accordingly, it is preferable to increase the linear damping coefficient $C_s$ as much as possible in order to improve the damping performance of the sprung member. However, if a vibration having the frequency greater than the sprung member resonation frequency, particularly the frequency between the sprung member resonation frequency and an unsprung member resonation frequency (approximately 11 Hz) (so called "intermediate frequency") is inputted into the suspension apparatus during damping control of the sprung member, the riding quality instead worsens as the damping force is increased. The degradation of the riding quality is particularly noticeable with high vibration speeds. In such a case, it is preferable to suppress the degradation of the riding quality by reducing the linear damping coefficient $C_s$ as much as possible.

Therefore, as can be understood from the foregoing, the aim of setting the linear damping coefficient $C_s$ differs depending on the purpose of the control. For this reason, it is difficult to control the damping force in a manner that both improves the damping performance of the sprung member and suppresses degradation in the riding quality when intermediate/high-frequency vibrations are inputted.

Having been achieved to address the aforementioned problem, it is an object of the present invention to provide a damping force control apparatus capable of quickly dampening vibrations in the sprung member and capable of suppressing a degradation in a riding quality when an intermediate/high-frequency vibration has been inputted.

An aspect of the present invention is to provide a damping force control apparatus that controls a damping force for a vibration in a suspension apparatus having a damper and a spring interposed between a sprung member and an unsprung member, the damping force control apparatus including: a variable damping coefficient calculation means for calculating a variable damping coefficient, the variable damping coefficient being a coefficient of a variable damping force to be generated by the damper relative to a vibration speed by applying a nonlinear H-infinity control theory to a control system designed based on the motion of the suspension apparatus; a linear damping coefficient determination means for determining a linear damping coefficient, the linear damping coefficient being a coefficient of a linear damping force to be generated by the damper relative to the vibration speed based on a magnitude of a vibration in the sprung member having a frequency within a specific frequency band determined in advance as a frequency band that is greater than a sprung member resonation frequency; a requested damping force calculation means for calculating a requested damping force, the requested damping force being a target damping force generated by the damper based on the variable damping coefficient and the linear damping coefficient; and a damping force characteristic control means for controlling a damping force characteristic of the damper based on the requested damping force. In this case, it is preferable for the linear damping coefficient determination means to determine the linear damping coefficient so as to decrease as an acceleration of the vibration in the sprung member having the frequency within the specific frequency band increases.

According to the present invention, the variable damping coefficient is calculated so as to suppress vibrations in the sprung member by applying the nonlinear H-infinity control theory to the control system designed based on the motion of the suspension apparatus. Furthermore, the linear damping coefficient can be determined so as to be lower as a value representing a vibration having the frequency within the specific frequency band set in advance which is greater than the sprung member resonation frequency (such as the acceleration of the vibration having the frequency within the specific frequency band) is greater.

Therefore, when the vibration having the frequency within the specific frequency band inputted into the suspension apparatus is low, or when no vibration having the frequency within the specific frequency band is inputted, the linear damping coefficient is set to a high value. As a result, the requested damping force calculated based on the variable damping coefficient and the linear damping coefficient also increases, and thus vibrations in the sprung member are quickly dampened. However, in the case where the inputted vibration having the frequency within the specific frequency band is great, the linear damping coefficient is set to a low value. This reduces the requested damping force. The specific frequency band is a frequency band that is higher than the sprung member resonation frequency, and thus vibrations having the frequency within the specific frequency band are intermediate/high-frequency vibrations. In other words, when the intermediate/high-frequency vibrations are great, the requested damping force decreases. This makes it possible to suppress degradation in the riding quality when an intermediate/high-frequency vibration is inputted, and makes it possible to suppress degradation in the riding quality particularly when the vibration speed is high. In this manner, the damping force control apparatus according to the present invention changes the magnitude of the linear damping coefficient in accordance with the magnitude of the value representing an inputted vibration having the frequency within the specific frequency band, and thus vibrations in the sprung member can be quickly dampened and a degradation in the riding quality when vibrations having the frequency within the intermediate/high frequency band are inputted.

It is preferable that the specific frequency band is an intermediate frequency band that is greater than the sprung member resonation frequency and less than an unsprung member resonation frequency. It is further preferable that the specific frequency band is a frequency band from approximately 3 Hz to 10 Hz. By setting the specific frequency band to such a frequency band, degradation in the riding quality when vibrations having the frequency within the intermediate frequency band are inputted is effectively suppressed.

Another aspect of the present invention is that the damping force control apparatus further includes a nonlinear weight determination means for determining a magnitude of a nonlinear weight that is set when the variable damping coefficient calculation means calculates the variable damping coefficient by applying the nonlinear H-infinity control theory based on the magnitude of the linear damping coefficient determined by the linear damping coefficient determination means. In this case, it is preferable for the nonlinear weight determination means to determine the magnitude of the nonlinear weight so that the requested damping force corresponds to a damping force within a range of variation for the damping force characteristic of the damper, or in other words, so that a Lissajous curve expressing the transition of the requested damping force relative to the vibration speed falls within the range of variation for the damping force characteristic of the damper. Furthermore, it is preferable for the nonlinear weight determination means to determine the nonlinear weight so as to decrease as the linear damping coefficient determined by the linear damping coefficient determination means decreases.

In the case where the linear damping coefficient has been changed by the linear damping coefficient determination means, the shape of the Lissajous curve expressing the transition of the requested damping force also changes in accordance with the change of the linear damping coefficient, and in some cases, the Lissajous curve extends outside of the range of variation for the damping force characteristic of the damper due to a change in the linear damping coefficient. Meanwhile, according to the present invention, the magnitude of the nonlinear weight that affects bulges in the Lissajous curve is determined in accordance with the magnitude of the linear damping coefficient. Therefore, even if the value of the linear damping coefficient has been changed, the Lissajous curve can be fallen within the range of variation for the damping force characteristic of the damper by determining an appropriate nonlinear weight in accordance with the changed linear damping coefficient.

In particular, there is a risk that the requested damping force will fall below the lower limit of the damping force characteristic of the damper in the case where the linear damping coefficient is low. In such a case, according to the present invention, the nonlinear weight is set so as to decrease as the linear damping coefficient decreases, to thereby the bulge in the Lissajous curve also shrinks as the linear damping coefficient decreases. The Lissajous curve thus falls within the range of variation for the damping force characteristic of the damper with certainty.

Notably, the nonlinear weight affects an evaluation output for a control system (generalized plant) to which the nonlinear H-infinity control theory is applied. By setting the nonlinear weight, the $L_2$ gain of the control system can be lowered in positions in which the state quantity is distanced from the origin.

In addition, yet another aspect of the present invention is that the damping force control apparatus further includes a corrected requested damping force calculation means for calculating a corrected requested damping force by correcting the requested damping force based on the magnitude of the linear damping coefficient determined by the linear damping coefficient determination means; and the damping force characteristic control means controls the damping force characteristic of the damper based on the corrected requested damping force instead of the requested damping force. In this case, it is preferable for the corrected requested damping force calculation means to calculate the corrected requested damping force so that the corrected requested damping force corresponds to a damping force within a range of variation for the damping force characteristic of the damper, or in other words, so that a Lissajous curve expressing the transition of the corrected required damping force falls within the range of variation for the damping force characteristic of the damper. According to this aspect, the requested damping force is corrected in accordance with the magnitude of the linear damping coefficient, thereby the Lissajous curve expressing the transition of the corrected requested damping force falls within the range of variation for the damping force characteristic of the damper, without changing the nonlinear weight.

In addition, it is preferable for the corrected requested damping force calculation means to calculate the corrected requested damping force when the linear damping coefficient determined by the linear damping coefficient determination means is less than a predetermined reference linear damping coefficient. In this case, it is preferable for the reference linear damping coefficient to be predetermined to a value in which, when the requested damping force is calculated using the reference linear damping coefficient, the requested damping force falls within the range of variation for the damping force characteristic of the damper, or in other words, a value in which a Lissajous curve expressing the transition of the requested damping force falls within the range of variation for the damping force characteristic of the damper. Furthermore, it is preferable for the reference linear damping coefficient to be equal to the greatest linear damping coefficient from among the linear damping coefficients determined by the linear damping coefficient determination means when an acceleration of a vibration having the frequency within the specific frequency band is not inputted.

Furthermore, it is preferable, in the case where the linear damping coefficient determined by the linear damping coefficient determination means is less than the reference linear damping coefficient, for the corrected requested damping force calculation means to calculate the corrected requested damping force based on a differential damping ratio. The differential damping ratio is a ratio of a reference damping force difference to a comparative damping force difference. The reference damping force difference is the difference between the reference linear damping force calculated by multiplying the reference linear damping coefficient by a vibration speed and a minimum damping force generated by the damper when that vibration speed is input. The comparative damping force difference is the difference between the linear damping force calculated by multiplying the linear damping coefficient determined by the linear damping coefficient determination means by a vibration speed and the minimum damping force. In this case, the requested damping force correcting means calculates the corrected requested damping force $F_{req}^*$ through the following equation, where $F_{req0}$ represents a reference requested damping force that is calculated by using the reference linear damping coefficient, G represents the differential damping ratio, $F_{s0}$ represents the reference linear damping force, and $F_s$ represents the linear damping force.

$$F_{req}^* = F_s - G(F_{s0} - F_{req0})$$

By calculating the corrected requested damping force $F_{req}^*$ based on the stated equation, a Lissajous curve expressing the transition of the corrected requested damping force $F_{req}^*$ falls within the range of variation for the damping force characteristic of the damper. Furthermore, the corrected requested damping force $F_{req}^*$ is determined so that the ratio of the difference between the reference linear damping force $F_{s0}$ and the minimum damping force to the difference between the requested damping force $F_{req0}$ and the minimum damping force, and the ratio of the difference between the linear damping force $F_s$ and the minimum damping force to the difference between the corrected requested damping force $F_{req}^*$ and the minimum damping force, are the same. Through this, the trend of the transition of the corrected requested damping force $F_{req}^*$ within the range of variation for the damping force characteristic of the damper matches the trend of the transition of the reference requested damping force $F_{req0}$.

Notably, the requested damping force $F_{req}$ does not appear in the above equation. However, because the reference requested damping force $F_{req0}$ can be expressed using the requested damping force $F_{req}$, the requested damping force $F_{req}$ can be incorporated into the above equation. In other words, the above equation expresses the corrected required damping force $F_{req}^*$ as a damping force obtained by correcting the requested damping force $F_{req}$.

Meanwhile, it is preferable for the calculation of the corrected requested damping force by the corrected requested damping force calculation means to be carried out in the case where there is the possibility that the requested damping force will depart from the range of variation of the damping force characteristic of the damper. In particular, it is preferable for the corrected requested damping force calculation means to calculate the corrected requested damping force when the variable damping coefficient is a negative value. When the variable damping coefficient is negative, the requested damping force is lower than the linear damping force. In the case where the linear damping coefficient is set to a low value at this time, the requested damping force may drop below the lower limit of the damping force characteristic of the damper. Therefore, by correcting the requested damping force in a situation where such a possibility exists, a Lissajous curve expressing the transition of the corrected requested damping force falls within the range of variation for the damping force characteristic of the damper.

In addition, yet another aspect of the present invention is that the variable damping coefficient calculation means calculates, by applying the nonlinear H-infinity control theory to a control system designed based on the motion of four suspension apparatuses attached in left- and right-front locations and left- and right-rear locations of the sprung member, variable damping coefficients that are coefficients of variable damping forces to be generated by dampers in the four suspension apparatuses relative to vibration speeds so that vibrations in a control target location of the sprung member caused by vertical motion, roll motion, and pitch motion of the sprung member are dampened, and the linear damping coefficient determination means determines linear damping coefficients which are coefficients of linear damping forces to be generated by the dampers in the four suspension apparatuses relative to vibration speeds so that the linear damping coefficients decrease as the vibration having the frequency within the specific frequency band increases.

Through this, vibrations generated by vertical (heave) motion, roll motion, and pitch motion (these vibrations are generally low-frequency vibrations) in a control target location of the sprung member are effectively dampened by applying the nonlinear H-infinity control theory to the control system designed based on the motion of the four suspension apparatuses expressed by the four-wheel vehicle model. Furthermore, a damping force for vibrations caused by the stated three types of motion can be ensured by the variable damping force, and the riding quality can be improved for inputted vibrations having the frequency within the specific frequency band by the linear damping force. Accordingly, low-frequency vibrations caused by the stated three types of motion can be dampened, and degradation in the riding quality can also be suppressed when vibrations having the frequency within the specific frequency band (the intermediate/high-frequency band) are inputted. Furthermore, because the linear damping coefficient changes so as not to affect the roll motion and pitch motion of the sprung member, the riding quality can be further improved.

DETAILED DESCRIPTION OF THE INVENTION

Hereinafter, embodiments of the present invention will be described.

First Embodiment

Figure 1:
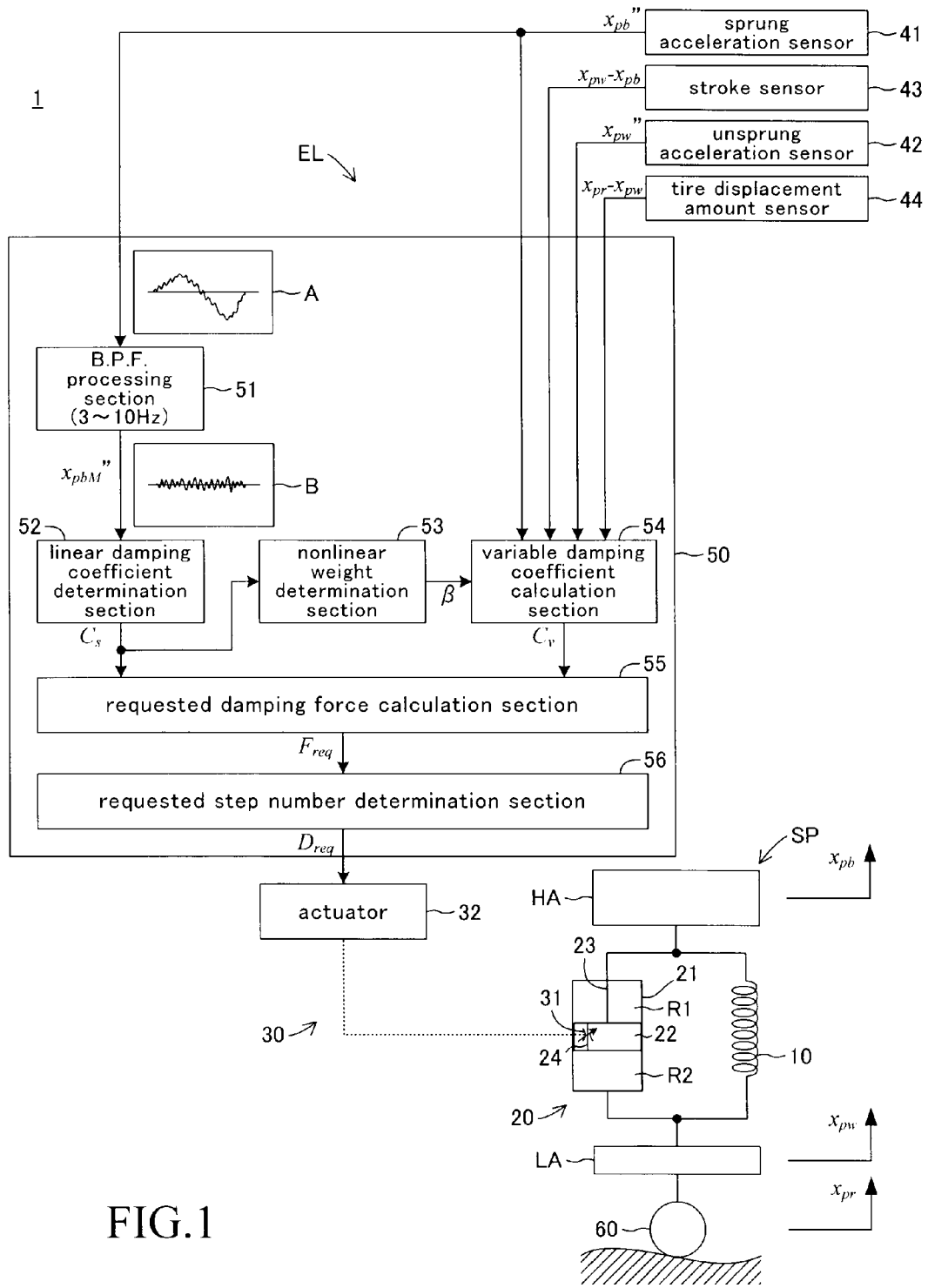
FIG. 1 is a general diagram illustrating an overall vehicle suspension control apparatus according to a first embodiment of the present invention.

FIG. 1 is a general diagram illustrating an overall vehicle suspension control apparatus according to a first embodiment of the present invention. As shown in FIG. 1, a suspension control apparatus 1 includes a suspension apparatus SP and an electric control apparatus EL.

Four suspension apparatuses SP are attached to the vehicle, at the left-front, right-front, left-rear, and right-rear thereof, and each suspension apparatus SP includes a spring 10 and a damper 20. The spring 10 and the damper 20 are interposed between a sprung member HA and an unsprung member LA of the vehicle, with one of the ends (the lower end) of the spring 10 and the damper 20 being connected to the unsprung member LA and the other of the ends (the upper end) of the spring 10 and the damper 20 being connected to the sprung member HA. In the present embodiment, the spring 10 is a coil spring. This spring is a vibrating body having a predetermined spring constant. The damper 20 is disposed so as to be parallel to the spring 10. The damper 20 dampens relative vibrations between the unsprung member LA and the sprung member HA. Note that a knuckle connected to a tire 60, a lower arm connected at one end to the knuckle, and so on correspond to the unsprung member LA. The sprung member HA is a member supported by the spring 10 and the damper 20, and the vehicle body is also included in the sprung member HA.

The damper 20 includes a cylinder 21, a piston 22, and a piston rod 23. The cylinder 21 is a hollow member that is filled with a viscous fluid such as oil or the like. The lower end of the cylinder 21 is connected to the lower arm, which serves as the unsprung member LA. The piston 22 is provided within the cylinder 21. This piston 22 is movable in the axial direction within the cylinder 21. One end of the piston rod 23 is connected to the piston 22. The piston rod 23 extends from that connected end upward in the axial direction of the cylinder 21 and protrudes to the exterior of the cylinder 21 from the upper end thereof. The other end is connected to the vehicle body, which serves as the sprung member HA.

As shown in the figure, an upper chamber R1 and a lower chamber R2 are formed in the cylinder 21 by the piston 22 provided within the cylinder 21. In addition, a communication channel 24 is formed in the piston 22. This communication channel 24 communicates between the upper chamber R1 and the lower chamber R2.

With the damper 20 structured as described thus far, when the sprung member HA vibrates relative to the unsprung member LA, the piston 22 that is connected to the sprung member HA via the piston rod 23 displaces relative to the cylinder 21 connected to the unsprung member LA in the axial direction. The viscous fluid flows through the communication channel 24 as a result of this relative displacement. The aforementioned vibrations are dampened by resistance generated during the viscous fluid flows through the communication channel 24. In other words, the stated resistance is a damping force exerted on the vibrations. Note that the magnitude of the damping force is proportional to the magnitude of the vibration speed of the sprung member HA relative to the unsprung member LA (this speed is a sprung-unsprung relative speed $x_{pw}'-x_{pb}'$, which will be mentioned later). The proportion coefficient is a damping coefficient.

A variable throttle mechanism 30 is attached to the suspension apparatus SP. The variable throttle mechanism 30 includes a valve 31 and an actuator 32. The valve 31 is provided in the communication channel 24 formed in the piston 22. When the valve 31 operates, the size of the cross-sectional area of the communication channel 24, or the number of the communication channel 24, or the like changes. In other words, an opening OP of the communication channel 24 changes when the valve 31 is operated. The valve 31 can be configured of, for example, a rotary valve embedded within the communication channel 24. The actuator 32 is connected to the valve 31. The valve 31 operates in tandem with the operation of the actuator 32. In the case where the valve 31 is, for example, a rotary valve as described above, the actuator 32 can be configured of a motor for rotating the rotary valve.

When the opening OP has been changed as the result of the valve 31 operating, the magnitude of the resistance occurring when the viscous fluid flows through the communication channel 24 also changes. This resistance force is, as mentioned above, a damping force exerted on the vibrations. Therefore, if the opening OP is changed, the damping force characteristic of the damper 20 is also changed. Note that the damping force characteristic corresponds to a characteristic of change in the damping force relative to the vibration speed (the sprung-unsprung relative speed).

Furthermore, in the present embodiment, the opening OP is set stepwise. Therefore, changing the opening OP results in a stepwise change in the damping force characteristic of the damper 20. The damping force characteristic is represented by the set step number of the opening OP. In other words, the damping force characteristic is displayed in the form of step number, or a first step, a second step, and so on, in accordance with the set step number of the opening OP. Therefore, the damping force characteristic of the damper 20 is variably controlled stepwise by controlling the step number. In this case, each step number representing damping force characteristic can be set so that, for example, the greater the number representing the step number, the greater the damping force is for a vibration speed (for the sprung-unsprung relative speed). The step number that represents the damping force characteristic is changed through the operation of the variable throttle mechanism 30, as mentioned above.

Next, the electric control apparatus EL will be described. The electric control apparatus EL includes a sprung acceleration sensor 41, an unsprung acceleration sensor 42, a stroke sensor 43, a tire displacement amount sensor 44, and a microcomputer 50. The sprung acceleration sensor 41 is attached to the vehicle body, and detects a sprung acceleration $x_{pb}''$ $(=d^2x_{pb}/dt^2)$, which is a vertical acceleration of the sprung member HA in relation to the absolute space. The unsprung acceleration sensor 42 is fixed to the unsprung member LA, and detects an unsprung member acceleration $x_{pw}''(=d^2x_{pw}/dt^2)$, which is a vertical acceleration of the unsprung member LA in relation to the absolute space. The sprung acceleration and the unsprung acceleration are detected as positive accelerations when both accelerations are in the upward direction and negative accelerations when both accelerations are in the downward direction. The stroke sensor 43 is disposed between the sprung member HA and the unsprung member LA, and detects a sprung-unsprung relative displacement amount $x_{pw}-x_{pb}$, which is the difference between an unsprung displacement amount $x_{pw}$ that is a displacement amount of the unsprung member LA in the vertical direction from a reference position (assuming that displacement upward from the reference position is positive and displacement downward from the reference position is negative) and a sprung displacement amount $x_{pb}$ that is a displacement amount of the sprung member HA in the vertical direction from a reference position (assuming that displacement upward from the reference position is positive and displacement downward from the reference position is negative). The tire displacement amount sensor 44 is attached to the unsprung member LA, and detects an unsprung relative displacement amount $x_{pr}-x_{pw}$, which is the difference between a road surface displacement amount $x_{pr}$ that is a displacement amount from a reference position on the road surface in the vertical direction (assuming that displacement in the upward direction from the reference position is positive and displacement in the downward direction from the reference position is negative) and the unsprung displacement amount $x_{pw}$. The unsprung relative displacement amount $x_{pr}-x_{pw}$ can be detected based on the output of, for example, a strain sensor that detects the degree of deformation of the tire 60, a pressure sensor that detects the air pressure in the tire 60, and so on.

The microcomputer 50 is electrically connected to the sprung acceleration sensor 41, the unsprung acceleration sensor 42, the stroke sensor 43, and the tire displacement amount sensor 44. The microcomputer 50 takes the values detected by the various sensors as inputs, and determines, based on the input values, a requested step number $D_{req}$ expressing a control target step number corresponding to a damping force characteristic. The microcomputer 50 then outputs, to the actuator 32, an instruction signal based on the determined requested step number $D_{req}$. The actuator 32 operates based on the aforementioned instruction signal. The valve 31 is operated as a result. In this manner, the microcomputer 50 variably controls the damping force characteristic of the damper 20 stepwise by controlling operation of the variable throttle mechanism 30. As a result of this variable control of the damping force characteristic of the damper 20, the damping force exerted on the vibrations of the suspension apparatus SP, or in other words, on the vibrations of the sprung member HA relative to the unsprung member LA is controlled. The microcomputer 50 corresponds to a damping force control apparatus according to the present invention.

The microcomputer 50 also includes a B.P.F. processing section 51, a linear damping coefficient determination section 52, a nonlinear weight determination section 53, a variable damping coefficient calculation section 54, a requested damping force calculation section 55, and a requested step number determination section 56, as seen in FIG. 1.

The B.P.F. processing section 51 takes the sprung acceleration $x_{pb}''$ from the sprung acceleration sensor 41 as an input, and executes a band pass filter process on the inputted sprung acceleration $x_{pb}''$. Acceleration in the 3 to 10 Hz frequency band is obtained as a result of this band pass filter process. The stated frequency band is an intermediate frequency band that is greater than the sprung member resonation frequency (approximately 1 Hz) and less than the unsprung member resonation frequency (approximately 11 Hz). Accordingly, in the case where the waveform of the sprung acceleration $x_{pb}''$ continually inputted into the B.P.F. processing section 51 is as illustrated in the graph A shown in the diagram, the waveform of an intermediate frequency sprung acceleration $x_{pbM}''$ that passes through the B.P.F. processing section 51 is represented only by an acceleration component from which a low-frequency component has been removed, as indicated by the graph B shown in the diagram.

The linear damping coefficient determination section 52 takes the intermediate frequency sprung acceleration $x_{pbM}''$ as an input. Furthermore, the linear damping coefficient $C_s$ is determined in accordance with the magnitude of the intermediate frequency sprung acceleration $x_{pbM}''$. The determined linear damping coefficient $C_s$ is then outputted. Note that as described above, the linear damping coefficient $C_s$ is a coefficient expressing the magnitude of the linear damping force in total damping force generated by the damper 20. The linear damping force is the linear component of the damping force that changes linearly relative to the vibration speed. The linear damping force is expressed as a value obtained by multiplying the vibration speed by the linear damping coefficient $C_s$.

The nonlinear weight determination section 53 takes the linear damping coefficient $C_s$ from the linear damping coefficient determination section 52 as an input, and determines a nonlinear weight β in accordance with the inputted linear damping coefficient $C_s$. The determined nonlinear weight β is then outputted.

The variable damping coefficient calculation section 54 takes values detected by the sensors 41, 42, 43, and 44 and the nonlinear weight β from the nonlinear weight determination section 53 as inputs, and calculates the variable damping coefficient $C_v$ based on these input values and the nonlinear weight β by applying the nonlinear H-infinity control theory to a control system designed based on the motion of the suspension apparatus SP. The calculated variable damping coefficient $C_v$ is then outputted. Note that the variable damping coefficient $C_v$ is, as described above, a coefficient expressing the magnitude of a variable damping force in total damping force generated by the damper 20. The variable damping force is a variable component of the damping force to be generated by the damper 20 obtained by removing the linear damping force from the total damping force. The variable damping force is expressed as a value obtained by multiplying the vibration speed by the variable damping coefficient $C_v$.

The requested damping force calculation section 55 takes the linear damping coefficient $C_s$ and the variable damping coefficient $C_v$ as inputs, and calculates the requested damping force $F_{req}$, which is a control target damping force to be generated by the damper 20, based on the inputted damping coefficients. The calculated requested damping force $F_{req}$ is then outputted. The requested step number determination section 56 takes the requested damping force $F_{req}$ as an input, and determines the requested step number $D_{req}$, which is the control target step number for the damping force characteristic of the damper 20, based on the inputted requested damping force $F_{req}$. A signal indicating the determined requested step number $D_{req}$ is then outputted to the actuator 32.

In the suspension control apparatus 1 configured as described thus far, a damping force control execution flag is set to ON in the case where, for example, the value detected by the sprung acceleration sensor 41 has exceeded a predetermined threshold (that is, in the case where damping force control is necessary in the suspension apparatus SP). The damping force control is commenced when the execution flag has been set to ON. When the damping force control is commenced, the linear damping coefficient determination section 52, the nonlinear weight determination section 53, the variable damping coefficient calculation section 54, the requested damping force calculation section 55, and the requested step number determination section 56 of the microcomputer 50 repeatedly execute the various processes described below.

Figure 2:
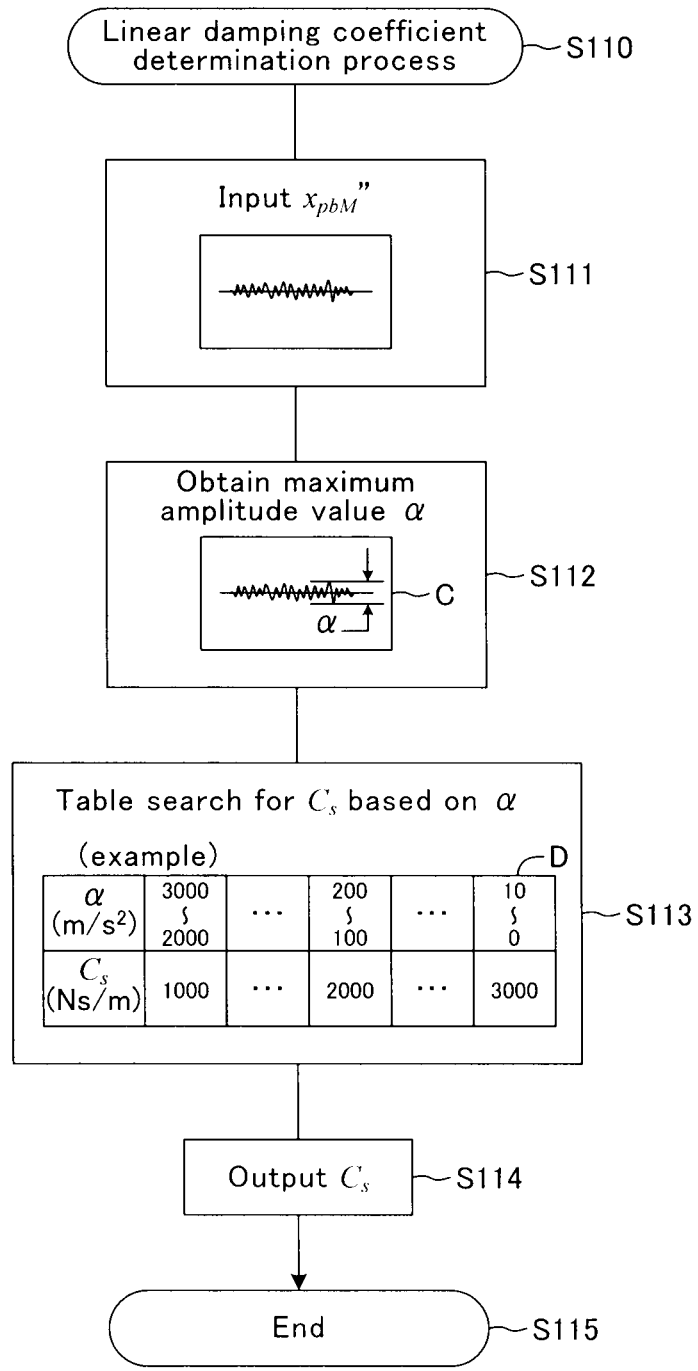
FIG. 2 is a flowchart illustrating the flow of a linear damping coefficient determination process executed by a linear damping coefficient determination section according to the first embodiment.

FIG. 2 is a flowchart illustrating the flow of a process executed by the linear damping coefficient determination section 52 of the microcomputer 50. The linear damping coefficient determination section 52 commences the linear damping coefficient determination process illustrated in FIG. 2 at step (step numbers will be abbreviated to S hereinafter) 110. Then, in S111, the intermediate frequency sprung acceleration $x_{pbM}''$ is inputted from the B.P.F. processing section 51.

Next, the linear damping coefficient determination section 52 advances to S112, and obtains, by measuring the amplitude value of the intermediate frequency sprung acceleration $x_{pbM}''$ inputted continuously within a predetermined time, a maximum amplitude value α of the intermediate frequency sprung acceleration $x_{pbM}''$ inputted during the stated predetermined time. The graph C shown in S112 in FIG. 2 indicates an acceleration waveform of the intermediate frequency sprung acceleration $x_{pbM}''$ inputted continuously during the predetermined time. The maximum amplitude value α of this acceleration waveform is obtained. The magnitude of the intermediate frequency sprung acceleration $x_{pbM}''$ is represented by the maximum amplitude value α.

Next, the linear damping coefficient determination section 52 advances to S113, where the linear damping coefficient $C_s$ is determined in accordance with the maximum amplitude value α. Specifically, the linear damping coefficient determination section 52 determines the linear damping coefficient $C_s$ by referring to a linear damping coefficient table. The linear damping coefficient table is stored within a memory of the microcomputer 50. In the linear damping coefficient table, a plurality of linear damping coefficients $C_s$ are associated with a plurality of maximum amplitude values α respectively. The table D within the box of S113 in FIG. 2 is an example of the linear damping coefficient table. As can be seen from the table D, the maximum amplitude value α and the linear damping coefficient $C_s$ are associated so that as the maximum amplitude value α increases, the linear damping coefficient $C_s$ associated with that maximum amplitude value α decreases continuously or stepwise. Therefore, the linear damping coefficient associated with the minimum value for the maximum amplitude value α (that is, α=0) is a maximum linear damping coefficient among the linear damping coefficients stored in the linear damping coefficient table. The value of this maximum linear damping coefficient should be set to a value that is great enough to quickly dampen vibrations of the sprung member HA. Furthermore, the linear damping coefficient associated with the maximum value for the maximum amplitude value α is a minimum linear damping coefficient among the linear damping coefficients stored in the linear damping coefficient table. The value of this minimum linear damping coefficient should be set to a value that is low enough to sufficiently suppress degradation in the riding quality caused by intermediate frequency sprung acceleration vibrations. In addition, all of the linear damping coefficients stored in the linear damping coefficient table are set so that the linear damping forces expressed by those linear damping coefficients fall within the range of variation for the damping force characteristic of the damper 20. The linear damping coefficient determination section 52 searches out, from the linear damping coefficient table, the linear damping coefficient $C_s$ associated with the maximum amplitude value α obtained in S112.

Next, the linear damping coefficient determination section 52 advances to S114, and outputs the linear damping coefficient $C_s$ associated with the maximum amplitude value α extracted through the search mentioned above. The process then advances to S115, and ends. The linear damping coefficient determination section 52 corresponds to a linear damping coefficient determination means according to the present invention.

Figure 3:
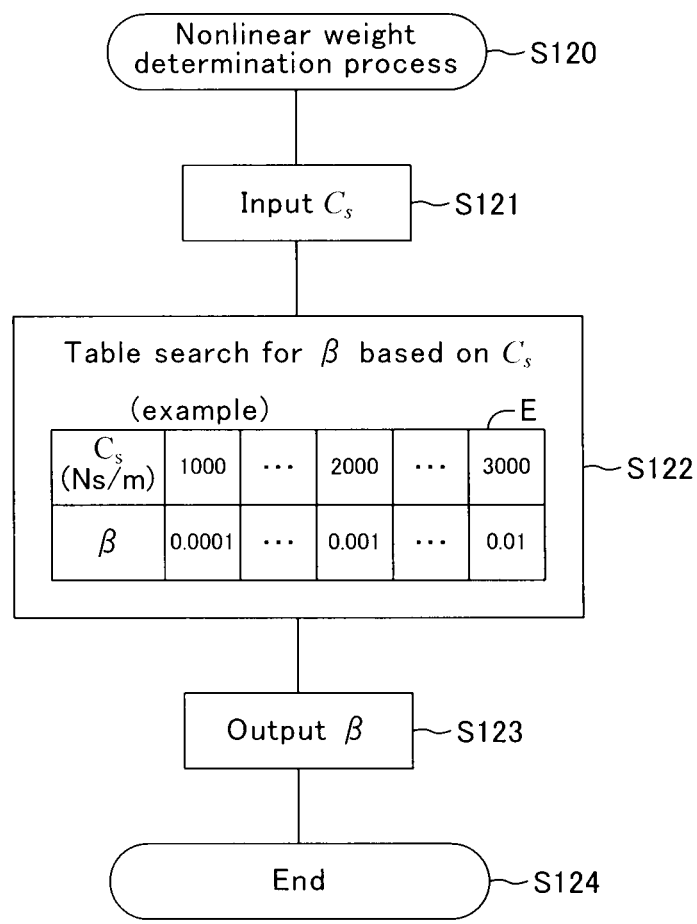
FIG. 3 is a flowchart illustrating the flow of a nonlinear weight determination process executed by a nonlinear weight determination section according to the first embodiment of the invention.

FIG. 3 is a flowchart illustrating the flow of a process executed by the nonlinear weight determination section 53 of the microcomputer 50. The nonlinear weight determination section 53 commences the nonlinear weight determination process illustrated in FIG. 3 at S120. Then, in S121, the linear damping coefficient $C_s$ is inputted from the linear damping coefficient determination section 52. Next, in S122, the nonlinear weight β is determined in accordance with the linear damping coefficient $C_s$. The nonlinear weight β is determined as a weight for calculating the variable damping coefficient $C_v$ by applying the nonlinear H-infinity control theory in the variable damping coefficient calculation section 54. Specifically, in this step, the nonlinear weight determination section 53 determines the nonlinear weight β by referring to a nonlinear weight table. The nonlinear weight table is stored within a memory of the microcomputer 50. In the nonlinear weight table, a plurality of nonlinear weights β are associated with a plurality of linear damping coefficients $C_s$ respectively. The table E within the box of S122 in FIG. 3 is an example of the nonlinear weight table. As can be seen from the table E, the linear damping coefficients $C_s$ and the nonlinear weights β are associated so that as the linear damping coefficient $C_s$ decreases, the nonlinear weight β associated with that linear damping coefficient $C_s$ decreases continuously or stepwise. Furthermore, the magnitude of the nonlinear weight is set so that, in the case where that weight is used along with the linear damping coefficient associated therewith in the calculation of the requested damping force, a Lissajous curve expressing the transition of the calculated requested damping force falls within the range of variation for the damping force characteristic of the damper 20 and the bulge of the Lissajous curve is as large as possible within the stated range of variation. The nonlinear weight determination section 53 searches out, from this nonlinear weight table, the nonlinear weight β associated with the linear damping coefficient $C_s$ inputted in S121.

Next, the nonlinear weight determination section 53 advances to S123, and outputs the nonlinear weight β extracted through the search mentioned above. The process then advances to S124, and ends. The nonlinear weight determination section 53 corresponds to a nonlinear weight determination means according to the present invention.

Figure 4:
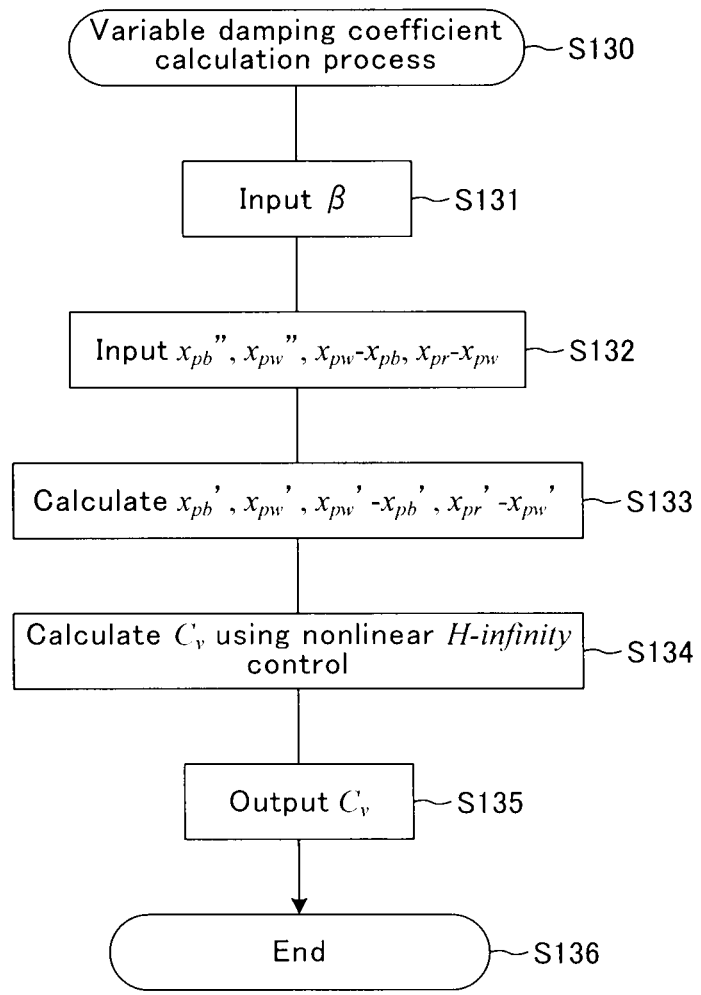
FIG. 4 is a flowchart illustrating the flow of a variable damping coefficient calculation process executed by a variable damping coefficient calculation section according to the first embodiment.

FIG. 4 is a flowchart illustrating the flow of a process executed by the variable damping coefficient calculation section 54 of the microcomputer 50. The variable damping coefficient calculation section 54 commences the variable damping coefficient calculation process illustrated in FIG. 4 at S130. Then, in S131, the nonlinear weight β is inputted from the nonlinear weight determination section 53. Next, in S132, the sprung acceleration $x_{pb}''$ is inputted from the sprung acceleration sensor 41, the unsprung member acceleration $x_{pw}''$ is inputted from the unsprung acceleration sensor 42, the sprung-unsprung relative displacement amount $x_{pw}-x_{pb}$ is inputted from the stroke sensor 43, and the unsprung relative displacement amount $x_{pr}-x_{pw}$ is inputted from the tire displacement amount sensor 44. Then, in S133, by integrating with time the sprung acceleration $x_{pb}''$ and the unsprung acceleration $x_{pw}''$, a sprung speed $x_{pb}'(=dx_{pb}/dt)$ that is a displacement speed of the sprung member HA in the vertical direction (assuming that a speed in the upward direction is a positive speed and a speed in the downward direction is a negative speed) and an unsprung speed $x_{pw}'(=dx_{pw}/dt)$ that is a displacement speed of the unsprung member LA in the vertical direction (assuming that a speed in the upward direction is a positive speed and a speed in the downward direction is a negative speed) are calculated. In addition, the sprung-unsprung relative speed $x_{pw}'-x_{pb}'$, which is the difference between the sprung speed $x_{pb}'$ and the unsprung speed $x_{pw}'$, is calculated by taking the time derivative of the sprung-unsprung relative displacement amount $x_{pw}-x_{pb}$. Furthermore, an unsprung relative speed $x_{pr}'-x_{pw}'$, which is the difference between a road surface speed $x_{pr}'(=dx_{pr}/dt)$ that is the displacement speed of the road surface in the vertical direction (assuming that a speed in the upward direction is a positive speed and a speed in the downward direction is a negative speed) and the unsprung speed $x_{pw}'$, is calculated by taking the time derivative of the unsprung relative displacement amount $x_{pr}-x_{pw}$. Note that the sprung-unsprung relative speed $x_{pw}'-x_{pb}'$ represents the vibration speed of the suspension apparatus SP, and is equivalent to the vibration speed of the piston 22 relative to the cylinder 21 (that is, a stroke speed).

In S134, the variable damping coefficient calculation section 54 calculates the variable damping coefficient $C_v$ based on the nonlinear H-infinity control theory. In this case, the variable damping coefficient calculation section 54 sets, for the variable damping coefficient $C_v$, a control input u of a control system (generalized plant) designed based on the motion of the suspension apparatus SP, and calculates the variable damping coefficient $C_v$ by applying the nonlinear H-infinity control theory to the control system. That is, the control input u, or in other words, the variable damping coefficient $C_v$, is calculated so that an $L_2$ gain of the system (that is, an $L_2$ gain from a disturbance w to an evaluation output z) is less than a positive constant γ. After the variable damping coefficient $C_v$ has been calculated in S134, the variable damping coefficient $C_v$ is outputted in S135. The process then advances to S136, and ends. The variable damping coefficient calculation section 54 corresponds to a variable damping coefficient calculation means according to the present invention.

In the present embodiment, the variable damping coefficient $C_v$ is calculated as the control input u by applying nonlinear H-infinity state feedback control to the control system designed based on the motion of the suspension apparatus SP expressed by a single-wheel model. An outline of a method for calculating the variable damping coefficient $C_v$ that uses the nonlinear H-infinity state feedback control according to the present embodiment will be described below.

Figure 7:
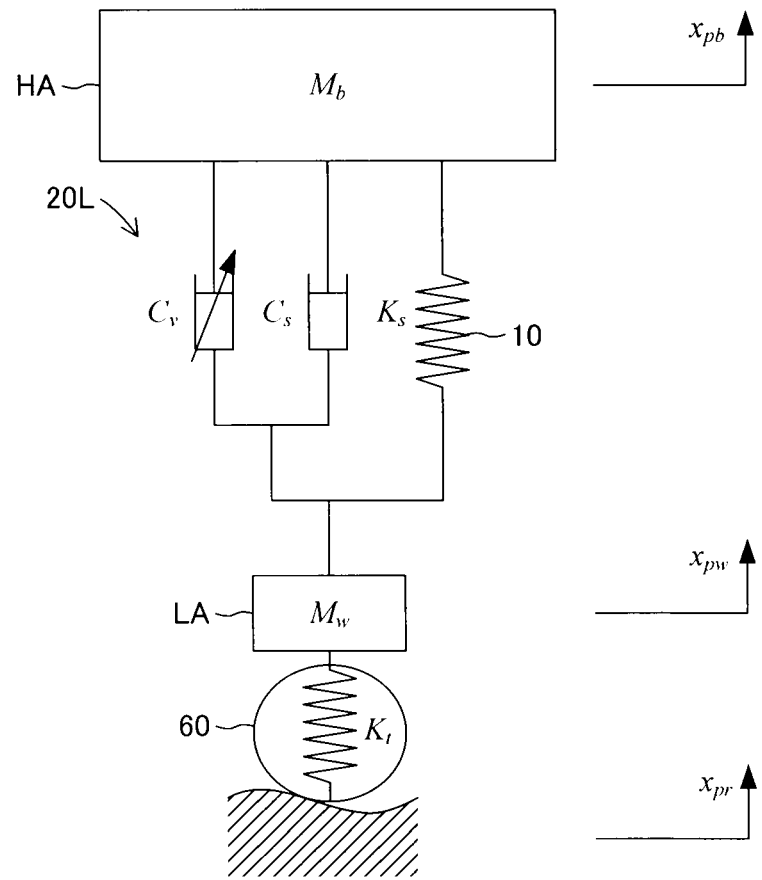
FIG. 7 is a diagram illustrating a single-wheel model of a suspension apparatus.

FIG. 7 is a diagram illustrating a single-wheel model of the suspension apparatus SP illustrated in FIG. 4. This model is a vibration system with two degrees of freedom. In the diagram, $M_b$ represents the mass of the sprung member HA, $M_w$ represents the mass of the unsprung member LA, $K_s$ represents the spring constant of the spring 10, $C_s$ represents the linear damping coefficient of the damper 20, $C_v$ represents the variable damping coefficient of the damper 20, $K_t$ represents an elastic coefficient of the tire 60, $x_{pb}$ represents the vertical displacement amount of the sprung member HA (that is, the sprung displacement amount), $x_{pw}$ represents the vertical displacement amount of the unsprung member LA (that is, the unsprung displacement amount), and $x_{pr}$ represents the vertical displacement amount of the road surface (that is, the road surface displacement amount).

Equations of motion for the suspension apparatus SP expressed by this single-wheel model is indicated by the following Equation (eq. 1).

$$\begin{cases} M_h x_{pb}'' = K_s(x_{pw} - x_{pb}) + C_s(x_{pw}' - x_{pb}') + C_v(x_{pw}' - x_{pb}') \\ M_w x_{pw}'' = K_t(x_{pr} - x_{pw}) - K_s(x_{pw} - x_{pb}) - \\ \quad C_s(x_{pw}' - x_{pb}') - C_v(x_{pw}' - x_{pb}') \end{cases} \quad \text{(eq. 1)}$$

From the motion equations (eq. 1), a state equation is derived as indicated by the following Equation (eq. 2). Here, a state quantity $x_p$ is equivalent to the unsprung relative displacement amount $x_{pr} - x_{pw}$, the sprung-unsprung relative displacement amount $x_{pw} - x_{pb}$, the unsprung speed $x_{pw}'$, and the sprung speed $x_{pb}'$. The disturbance w is equivalent to the road surface speed $x_{pr}'$. Meanwhile, the control input u is equivalent to the variable damping coefficient $C_v$.

$$x_p' = A_p x_p + B_{p1} w + B_{p2}(x_p) u \quad \text{(eq. 2)}$$

$$x_p = \begin{bmatrix} x_{pr} - x_{pw} \\ x_{pw} - x_{pb} \\ x_{pw}' \\ x_{pb}' \end{bmatrix}, \quad w = x_{pr}', \quad u = C_v$$

$$A_p = \begin{bmatrix} 0 & 0 & -1 & 0 \\ 0 & 0 & 1 & -1 \\ \frac{K_t}{M_w} & -\frac{K_s}{M_w} & -\frac{C_s}{M_w} & \frac{C_s}{M_w} \\ 0 & \frac{K_s}{M_b} & \frac{C_s}{M_b} & -\frac{C_s}{M_b} \end{bmatrix}, \quad B_{p1} = \begin{bmatrix} 1 \\ 0 \\ 0 \\ 0 \end{bmatrix},$$

$$B_{p2}(x_p) = \begin{bmatrix} 0 \\ 0 \\ -\frac{x_{pw}' - x_{pb}'}{M_w} \\ \frac{x_{pw}' - x_{pb}'}{M_b} \end{bmatrix}$$

Furthermore, an output equation is written as indicated in the following Equation (eq. 3). Here, an evaluation output $z_p$ is equivalent to the sprung acceleration $x_{pb}''$, the sprung speed $x_{pb}'$, and the sprung-unsprung relative speed $x_{pw}' - x_{pb}'$.

$$z_p = C_{p1} x_p + D_{p12}(x_p) u \quad \text{(eq. 3)}$$

$$z_p = \begin{bmatrix} x_{pb}'' \\ x_{pb}' \\ x_{pw}' - x_{pb}' \end{bmatrix}, \quad C_{p1} = \begin{bmatrix} 0 & \frac{K_s}{M_b} & \frac{C_s}{M_b} & -\frac{C_s}{M_b} \\ 0 & 0 & 0 & 1 \\ 0 & 0 & 1 & -1 \end{bmatrix},$$

$$D_{p12}(x_p) = \begin{bmatrix} \frac{x_{pw}' - x_{pb}'}{M_b} \\ 0 \\ 0 \end{bmatrix}$$

Therefore, a state space representation is written as indicated in the following Equation (eq. 4).

$$\begin{cases} x_p' = A_p x_p + B_{p1} w + B_{p2}(x_p) u \\ z_p = C_{p1} x_p + D_{p12}(x_p) u \end{cases} \quad \text{(eq. 4)}$$

Figure 8:
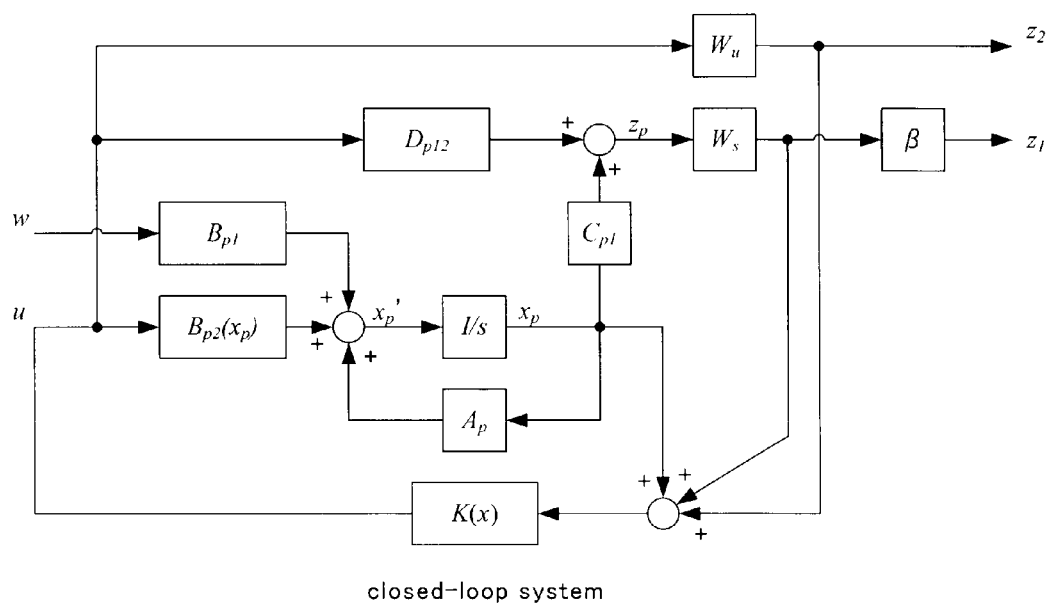
FIG. 8 is a block diagram illustrating a closed-loop system in which the state quantity of a generalized plant is fed back.

FIG. 8 is a block diagram illustrating a closed-loop system (control system) of a generalized plant designed based on the aforementioned Equation (eq. 4). As can be seen from FIG. 8, a frequency weight $W_s$, which is a weight that fluctuates depending on the frequency, acts on the evaluation output $z_p$. The state space representation of the frequency weight $W_s$ is written as indicated in the following Equation (eq. 5), using a state quantity $x_w$, an output $z_w$, and respective constant matrices $A_w$, $B_w$, $C_w$, and $D_w$.

$$\begin{cases} x_w' = A_w x_w + B_w z_p \\ z_w = C_w x_w + D_w z_p \end{cases} \quad \text{(eq. 5)}$$

where $$x_w' = \frac{dx_w}{dt}$$

The Equation (eq. 5) can be rewritten as indicated in the following Equation (eq. 6).

$$\begin{cases} x'_w = A_w x_w + B_w C_{p1} x_p + B_w D_{p12}(x_p)u \\ z_w = C_w x_w + D_w C_{p1} x_p + D_w D_{p12}(x_p)u \end{cases} \quad (\text{eq. 6})$$

Furthermore, a frequency weight $W_u$ that fluctuates depending on the frequency acts on the control input u as well. The state space representation of the frequency weight $W_u$ is expressed as indicated in the following Equation (eq. 7), using a state quantity $x_u$, an output $z_u$, and respective constant matrices $A_u$, $B_u$, $C_u$, and $D_u$.

$$\begin{cases} x'_u = A_u x_u + B_u u \\ z_u = C_u x_u + D_u u \end{cases} \quad (\text{eq. 7})$$

where, $$x'_u = \frac{dx_u}{dt}$$

Meanwhile, the nonlinear weight β acts on an output obtained by causing the frequency weight $W_s$ to act on the evaluation output $z_p$. The nonlinear weight β is a weight placed on the evaluation output $z_p$, and is introduced in order to improve the control performance in the case where the state quantity is distanced from the origin. Introducing this nonlinear weight β makes it possible to actively reduce the $L_2$ gain of the closed-loop system shown in FIG. 8. Note that a nonlinear weight may also be caused to act on an output obtained by causing the frequency weight $W_u$ to act on the control input u.

The state space representation of the generalized plant illustrated in FIG. 8 is written as indicated in the following Equation (eq. 8).

$$\begin{cases} \dot{x} = Ax + B_1 w + B_2(x)u \\ z_1 = \beta(C_{11}x + D_{121}u) \\ z_2 = C_{12}x + D_{122}u \end{cases} \quad (\text{eq. 8})$$

Here, $$x = \begin{bmatrix} x_p \\ x_w \\ x_u \end{bmatrix}, A = \begin{bmatrix} A_p & o & o \\ B_w C_{p1} & A_w & o \\ o & o & A_u \end{bmatrix},$$

$$B_1 = \begin{bmatrix} B_{p1} \\ o \\ o \end{bmatrix}, B_2(x) = \begin{bmatrix} B_{p2}(x_p) \\ B_w D_{p12}(x_p) \\ B_u \end{bmatrix}$$

$$C_{11} = [D_w C_{p1} \quad C_w \quad o], D_{121} = [D_w D_{p12}],$$

$$C_{12} = [o \quad o \quad C_u], D_{122} = D$$

The generalized plant represented by the Equation (eq. 8) is a bilinear system. Therefore, if a positive definite symmetric matrix P that satisfies the Riccati inequality shown in the following Equation (eq. 9) is present for a certain provided positive constant γ, the generalized plant closed-loop system becomes internally stable, and a state feedback controller K (=K(x)) in which the $L_2$ gain from the disturbance w to the evaluation output z (that is, the $L_2$ gain of the closed-loop system) is less than the positive constant γ can be designed.

$$PA + A^T P + \frac{1}{\gamma^2} PB_1 B_1^T P + C_{11}^T C_{11} + C_{12}^T C_{12} < 0 \quad (\text{eq. 9})$$

Here, one of the controllers K (=K(x)) is written as indicated in the following Equation (eq. 10).

$$K(x) = u = -D_{122}^{-1}\{(1+m(x)x^T C_{11}^T C_{11} x)D_{122}^{-T} B_2^T(x) P + C_{12}\}x \quad (\text{eq. 10})$$

Note that m(x) is a given positive definite function. Using the conditions indicated in Equation (eq. 11), the Equation (eq. 10) is written as indicated in Equation (eq. 12).

$$C_{12} = o, D_{122} = I \quad (\text{eq. 11})$$

$$K(x) = u = -\{(1+m(x)x^T C_{11}^T C_{11} x)B_2^T(x)P\}x \quad (\text{eq. 12})$$

Accordingly, the control input u is calculated based on the state feedback controller K (=K(x)) designed as indicated by, as one example, the aforementioned Equation (eq. 12), or in other words, the state feedback controller K (=K(x)) designed so that the $L_2$ gain of the closed-loop system illustrated in FIG. 8 is less than the positive constant γ. The variable damping coefficient $C_v$ is obtained from the calculated control input u. The obtained variable damping coefficient $C_v$ is used in the calculation of the requested damping force by the requested damping force calculation section 55.

Figure 5:
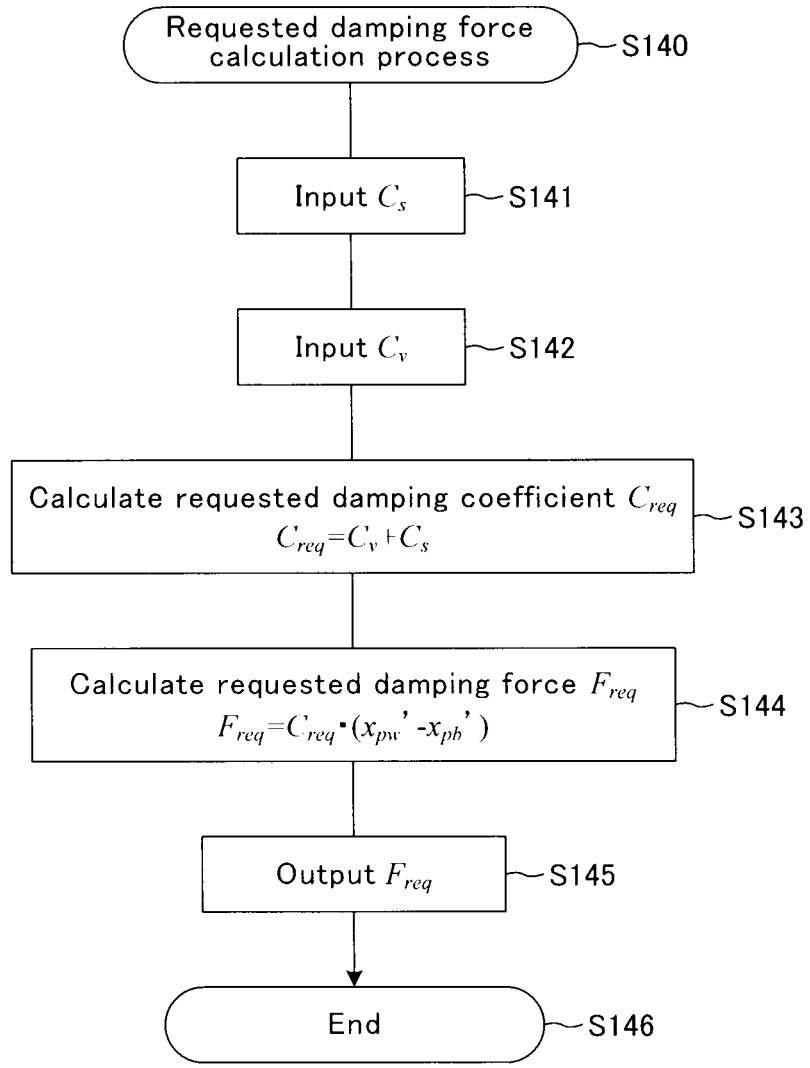
FIG. 5 is a flowchart illustrating the flow of a requested damping force calculation process executed by a requested damping force calculation section according to the first embodiment.

FIG. 5 is a flowchart illustrating the flow of a process executed by the requested damping force calculation section 55. The requested damping force calculation section 55 commences the requested damping force calculation process illustrated in FIG. 5 at S140. Then, in S141, the linear damping coefficient $C_s$ is inputted from the linear damping coefficient determination section 52. Next, in S142, the variable damping coefficient $C_v$ is inputted from the variable damping coefficient calculation section 54. Then, in S143, a requested damping coefficient $C_{req}$ is calculated. The requested damping coefficient $C_{req}$ is found by adding the linear damping coefficient $C_s$ to the variable damping coefficient $C_v$. The requested damping force calculation section 55 then advances to S144, where the requested damping force $F_{req}$, which is a control target damping force, is calculated. The requested damping force $F_{req}$ is found by multiplying the requested damping coefficient $C_{req}$ by the sprung-unsprung relative speed $x_{pw}' - x_{pb}'$. Next, in S145, the requested damping force $F_{req}$ is outputted. The process then advances to S146, and ends. The requested damping force calculation section 55 corresponds to a requested damping force calculation means according to the present invention.

Figure 6:
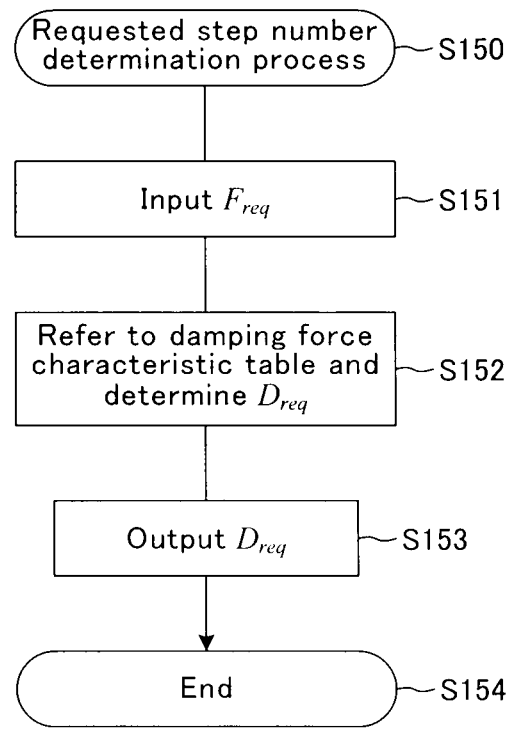
FIG. 6 is a flowchart illustrating the flow of a requested step number determination process executed by a requested step number determination section according to the first embodiment.

FIG. 6 is a flowchart illustrating the flow of a process executed by the requested step number determination section 56. The requested step number determination section 56 commences the requested step number determination process illustrated in FIG. 6 at S150. Next, in S151, the requested damping force $F_{req}$ is inputted. Then, in S152, the requested step number $D_{req}$ is determined. The requested step number determination section 56 refers to a damping force characteristic table in order to determine the requested step number $D_{req}$. The damping force characteristic table is stored within a memory of the microcomputer 50. In the damping force characteristic table, a plurality of sprung-unsprung relative speeds are associated with a plurality of damping forces generated by the damper 20 in correspondence with the sprung-unsprung relative speeds for each step number expressing a damping force characteristic of the damper 20. In S152, the requested step number determination section 56 selects the damping force corresponding to the sprung-unsprung relative speed $x_{pw}'-x_{pb}'$ on a step number-by-step number basis. Furthermore, the damping force that is closest to the requested damping force $F_{req}$ is ultimately selected from the damping forces selected on the step number-by-step number basis. The step number corresponding to the damping force that is ultimately selected is set as the requested step number $D_{req}$.

After the requested step number $D_{req}$ has been determined in S152, the requested step number determination section 56 advances to S153, where a signal based on the requested step number $D_{req}$ is outputted to the actuator 32. The process then advances to S154, and ends. Having received the instruction signal, the actuator 32 operates based on that instruction signal. The valve 31 operates in tandem with the operation of the actuator 32. As a result, the variable throttle mechanism 30 is controlled so that the step number expressing the damping force characteristic of the damper 20 is equivalent to the requested step number $D_{req}$. The damping force characteristic of the damper 20 is controlled stepwise as a result of such control of the variable throttle mechanism 30. The requested step number determination section 56 corresponds to a damping force characteristic control means according to the present invention.

Figure 9:
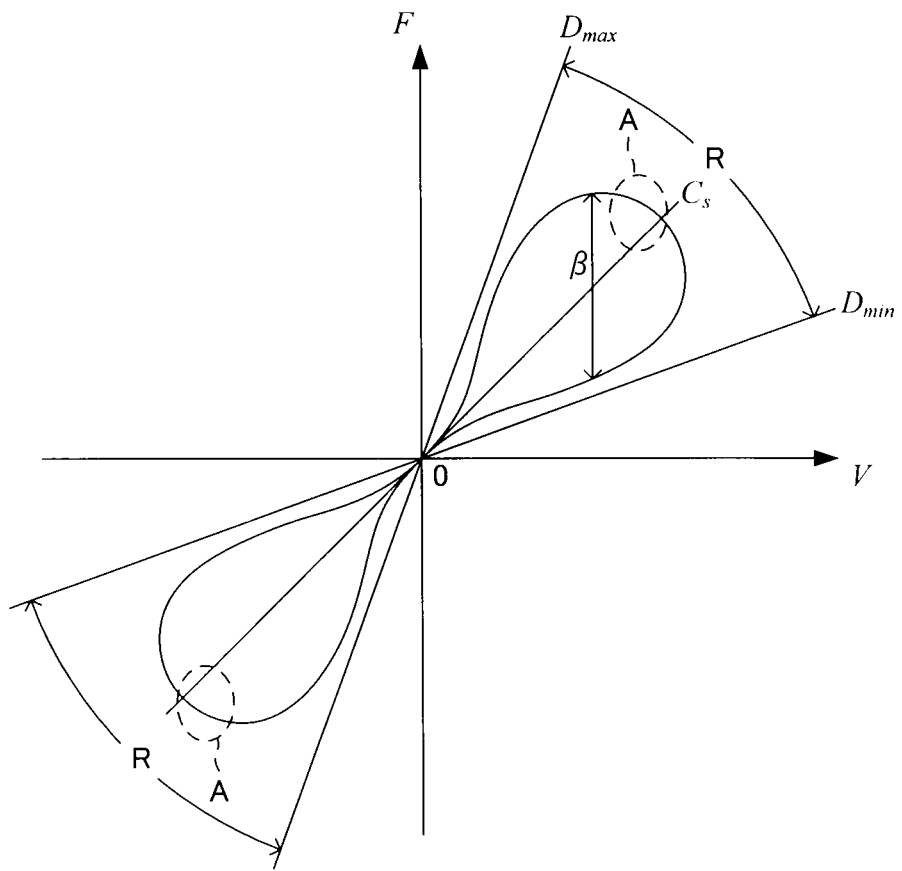
FIG. 9 is a damping force characteristic graph illustrating a Lissajous curve expressing the transition of a requested damping force and a range of variation of the damping force represented by damping force characteristic of a damper.

The microcomputer 50 controls the damping force generated by the damper 20 in response to vibrations of the suspension apparatus SP in accordance with the processes described above. In the present embodiment, this damping force control is carried out independently for each suspension apparatus. FIG. 9 is a damping force characteristic graph indicating an example of a Lissajous curve that expresses the transition of the requested damping force $F_{req}$ calculated by the requested damping force calculation section 55 and the range of variation for the damping force characteristic of the damper 20, in the case where the maximum amplitude value $\alpha$ of the intermediate frequency sprung acceleration $x_{pbM}''$ inputted into the linear damping coefficient determination section 52 is 0, or in other words, in the case where the intermediate frequency sprung acceleration is not inputted. The horizontal axis of the damping force characteristic graph represents an sprung-unsprung relative speed V, whereas the vertical axis represents a damping force F. Furthermore, the range of variation for the damping force characteristic of the damper 20 is expressed as a region R, which falls between a damping force characteristic line expressed by a step number $D_{min}$ set when the generated damping force is minimum and a damping force characteristic expressed by a step number $D_{max}$ set when the generated damping force is maximum. As can be seen from this diagram, the transition of the requested damping force $F_{req}$ is expressed as a smooth Lissajous curve. This Lissajous curve is formed so as to bulge upward and downward from the damping force characteristic line expressed by the linear damping coefficient $C_s$ (there are cases where the amounts of the bulge in the upward and downward directions are not equal). Furthermore, the linear damping coefficient $C_s$ affects the trend of the transition in the requested damping force $F_{req}$, e.g. affects the average slope of the Lissajous curve.

In the present embodiment, when the maximum amplitude value $\alpha$ of the intermediate frequency sprung acceleration $x_{pbM}''$ is 0, the linear damping coefficient $C_s$ is set to the maximum value in a range at which the Lissajous curve falls within the range of variation R for the damping force characteristic of the damper 20. For this reason, the requested damping force also takes on a high value, and thus a greater damping force is generated by the damper 20. As a result, a strong damping force works on the sprung member HA, thus quickly damping vibrations in the sprung member HA.

On the other hand, in the case where the maximum amplitude value $\alpha$ of the intermediate frequency sprung acceleration $x_{pbM}''$ is high, an appropriate requested damping force $F_{req}$ cannot be calculated due to delay in the response of the actuator 32, time restrictions in the calculations performed by the microcomputer 50, and so on in regions where the sprung-unsprung relative speed V is high (for example, a region enclosed by the dotted line A in FIG. 9). In such a case, it is better, from the perspective of improving the riding quality, for the linear damping coefficient $C_s$ to be as low as possible. Conventionally, the linear damping coefficient $C_s$ has been fixed at as high a value as possible in order to quickly dampen vibrations in the sprung member HA, regardless of whether the maximum amplitude value $\alpha$ of the intermediate frequency sprung acceleration $x_{pbM}''$ is high or low. Therefore, in the case where the maximum amplitude value $\alpha$ of the intermediate frequency sprung acceleration $x_{pbM}''$ has increased, the riding quality of the vehicle has worsened particularly in regions where the sprung-unsprung relative speed V is great (for example, the region A in the diagram).

Figure 10:
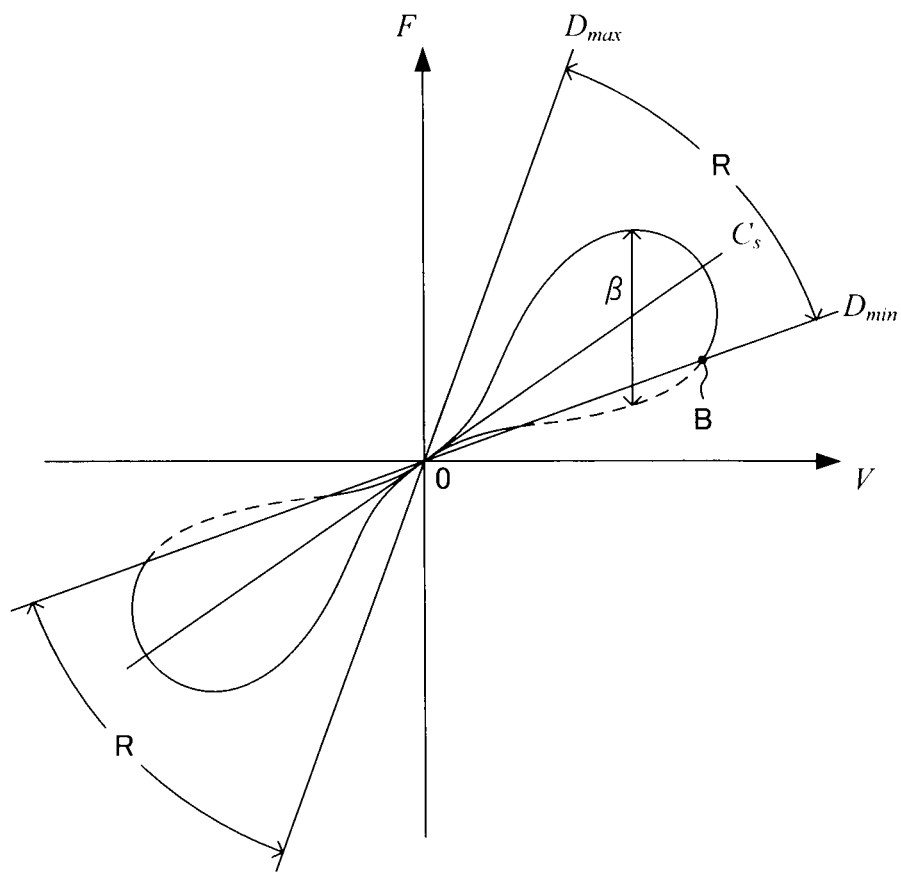
FIG. 10 is a damping force characteristic graph illustrating a Lissajous curve expressing the transition of a requested damping force and a range of variation of the damping force represented by the damping force characteristic of a damper, in the case where a linear damping coefficient has been reduced.

As opposed to this, in the present embodiment, the linear damping coefficient $C_s$ is set to a smaller value the greater the maximum amplitude value $\alpha$ of the intermediate frequency sprung acceleration $x_{pbm}''$ is. FIG. 10 is a damping force characteristic graph indicating a Lissajous curve expressing the transition of the requested damping force $F_{req}$ and the range of variation R for the damping force characteristic of the damper 20, in the case where the linear damping coefficient $C_s$ is changed to a smaller value as the maximum amplitude value $\alpha$ increases. The slope of the damping force characteristic line expressed by the linear damping coefficient $C_s$ shown in FIG. 10 is less than the slope of the damping force characteristic line expressed by the linear damping coefficient $C_s$ shown in FIG. 9. In addition, the requested damping force indicated in FIG. 10 is lower than the requested damping force indicated in FIG. 9, even under the same conditions. In other words, the requested damping force calculated in the case where the maximum amplitude value $\alpha$ is high is lower compared to the requested damping force calculated in the case where the maximum amplitude value $\alpha$ is low. That is, the requested damping force $F_{req}$ decreases as the maximum amplitude value $\alpha$ increases. As the requested damping force decreases, the damping force generated by the damper 20 also decreases. By decreasing the damping force, degradation in the riding quality when intermediate frequency vibrations are inputted, and particularly degradation in the riding quality when the vibration speed is high, is suppressed.

However, in the case where the linear damping coefficient $C_s$ has been reduced, the Lissajous curve takes on a shape that is tilted to the side, as shown in FIG. 10, and the portion of the Lissajous curve indicated by the dotted line falls outside of the lower limit of the range of variation R for the damping force characteristic of the damper 20. In the case where the requested damping force $F_{req}$ has moved below the range of variation R, the step number expressing the damping force characteristic of the damper 20 is forcefully set (fixed) to the step number $D_{min}$, and thus the appropriate damping force control based on the value of the requested damping force $F_{req}$ cannot be carried out. In addition, the requested damping force $F_{req}$ changes in a non-continuous manner at the point B in FIG. 10, or in other words, at the lower limit of the range of variation R for the damping force characteristic of the damper 20. The non-continuous change in the damping force imparts a sense of discomfort on an occupant, which causes the riding quality to worsen.

In the present embodiment, when the maximum amplitude value α of the intermediate frequency sprung acceleration $x_{pbM}''$ is high, the linear damping coefficient $C_s$ is set to a low value in order to prevent the riding quality of the vehicle from degradation, and the nonlinear weight β used when calculating the variable damping coefficient $C_v$ is also adjusted by the nonlinear weight determination section 53. As shown in FIG. 8, the nonlinear weight β acts on the output obtained by causing the frequency weight $W_s$ to act on the evaluation output $z_p$. Accordingly, a weight $βW_s$ acts on the evaluation output $z_p$. Meanwhile, the nonlinear H-infinity control is disturbance suppression control that controls the system so that the disturbance w affects the evaluation output $z_p$ as little as possible. Therefore, when a sensitivity function is expressed as S, the state feedback controller is designed so that the following inequality (eq. 13) holds true.

$$\|βW_sS\|_∞ < 1 \qquad \text{(eq. 13)}$$

Figure 12:
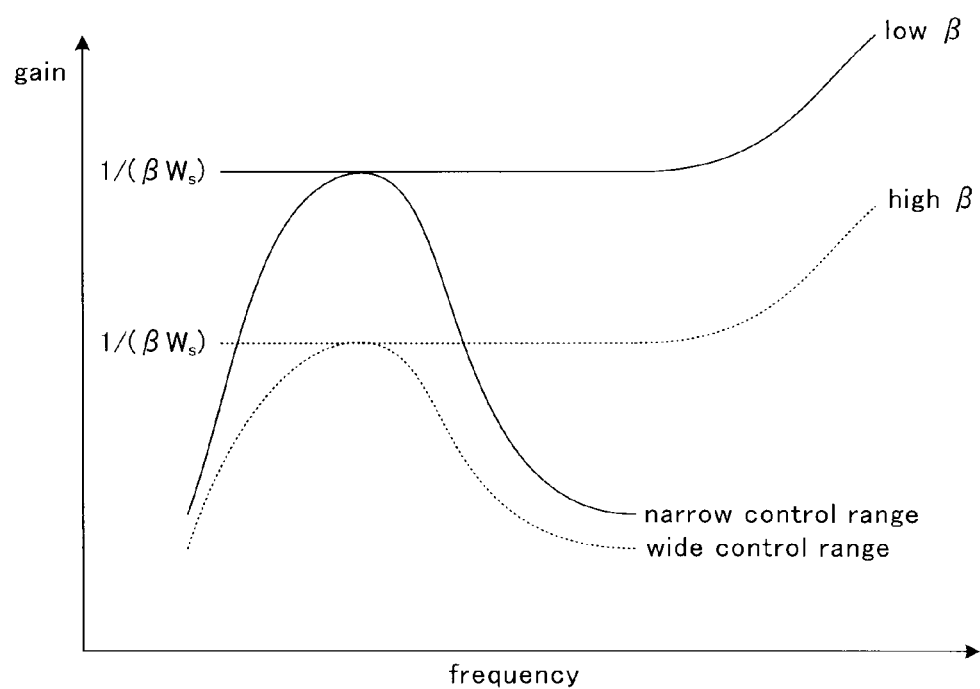
FIG. 12 is a diagram illustrating a relationship between the magnitude of a nonlinear weight and a bulge in the Lissajous curve expressing the transition of a required damping force.

As the nonlinear weight β increases, the sensitivity function S decreases relatively in order to ensure that the Equation (eq. 13) holds true, thus improving the controllability for suppressing disturbances. However, this makes it difficult to find the solution to the controller. Thus the fluctuation range of the state feedback controller grows (that is, the control range increases, and the bulge in the Lissajous curve grows). Conversely, when the nonlinear weight β decreases, the sensitivity function S may be increased within the range in which the Equation (eq. 13) still holds true. As the sensitivity function S increases, the control deviation also increases, which worsens the controllability. However, this makes it easy to find the solution to the controller. Thus, the fluctuation range of the state feedback controller shrinks (that is, the control range narrows and the bulge in the Lissajous curve shrinks). In other words, as shown in FIG. 12, as the nonlinear weight β increases, it becomes difficult to carry out control so that the sensitivity function drops below $(1/(βW_s))$, and as a result, the bulge in the Lissajous curve of the required damping force $F_{req}$ grows. Conversely, as the nonlinear weight β decreases, the bulge in the Lissajous curve shrinks.

Figure 11:
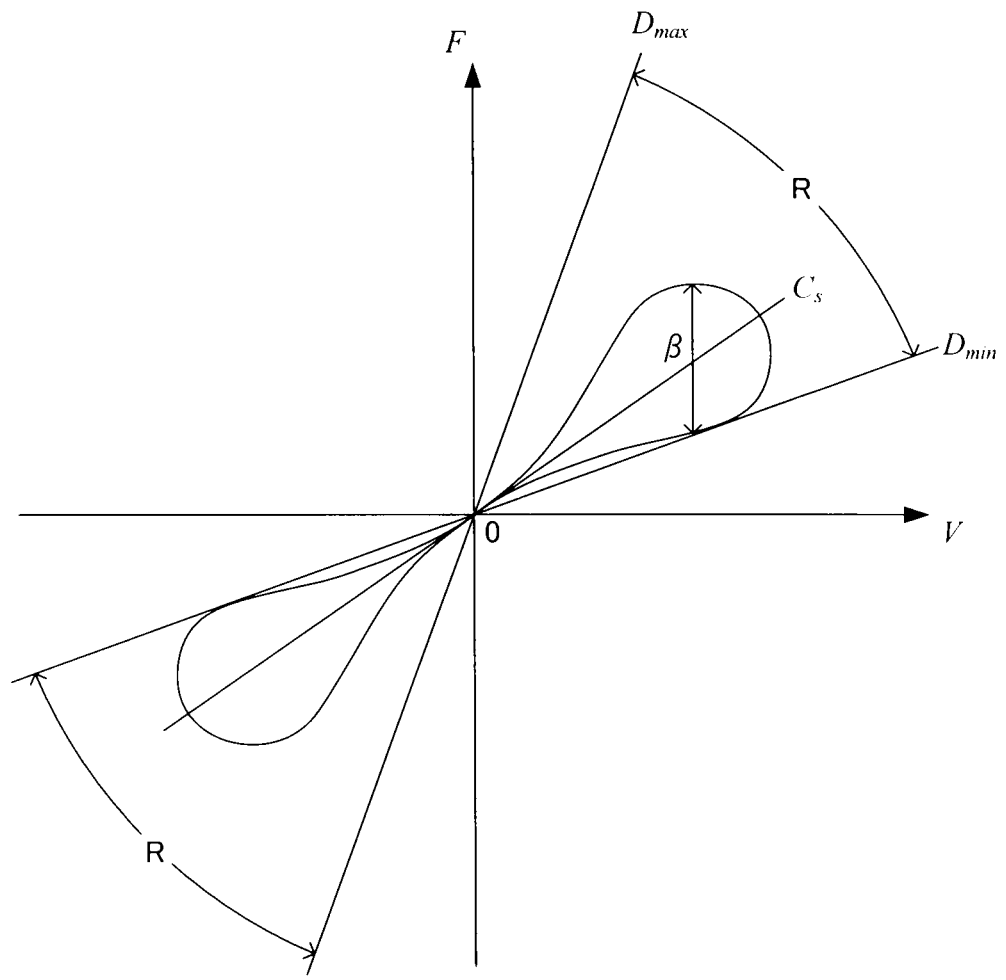
FIG. 11 is a damping force characteristic graph illustrating a Lissajous curve expressing the transition of a requested damping force and a range of variation of the damping force represented b by the damping force characteristic of a damper, in the case where a nonlinear weight has been reduced.

The present embodiment focuses on this point, adjusting the bulge in the Lissajous curve expressing the requested damping force $F_{req}$ by adjusting the nonlinear weight β in accordance with the magnitude of the linear damping coefficient $C_s$. Specifically, the nonlinear weight β is set to a lower value the lower the linear damping coefficient $C_s$ is, so that the bulge of the Lissajous curve falls within the range of variation R for the damping force characteristic of the damper 20. Furthermore, at this time, the nonlinear weight β is set so that the bulge of the Lissajous curve is as great as possible while still falling within the range of variation R. When the nonlinear weight β is determined in this manner, the Lissajous curve falls within the range of variation R for the damping force characteristic of the damper 20 even when the linear damping coefficient $C_s$ has been reduced, as shown in FIG. 11. For this reason, the requested damping force does not change in a non-continuous manner at the lower limit of the range of variation R. Therefore, a sense of discomfort caused by non-continuous changes in the requested damping force is not imparted on the occupant.

As described thus far, according to the present embodiment, the linear damping coefficient $C_s$ is set lower the greater the maximum amplitude value α of the intermediate frequency sprung acceleration $x_{pbM}''$ is, and thus vibrations in the sprung member HA are quickly dampened, and degradation of the riding quality is suppressed when the intermediate frequency sprung acceleration is inputted. Furthermore, because the nonlinear weight β is set lower the lower the linear damping coefficient $C_s$ is, the Lissajous curve expressing the transition of the requested damping force $F_{req}$ falls within the range of variation R for the damping force characteristic of the damper 20.

Second Embodiment

In the aforementioned first embodiment, the damping force is controlled so that the Lissajous curve expressing the transition of the requested damping force $F_{req}$ falls within the range of variation R for the damping force characteristic of the damper 20, by changing the value of the nonlinear weight β in accordance with the magnitude of the linear damping coefficient $C_s$. However, in the present embodiment, the requested damping force is corrected so that the requested damping force falls within the range of variation for the damping force characteristic of the damper in accordance with changes in the linear damping coefficient $C_s$.

Figure 13:
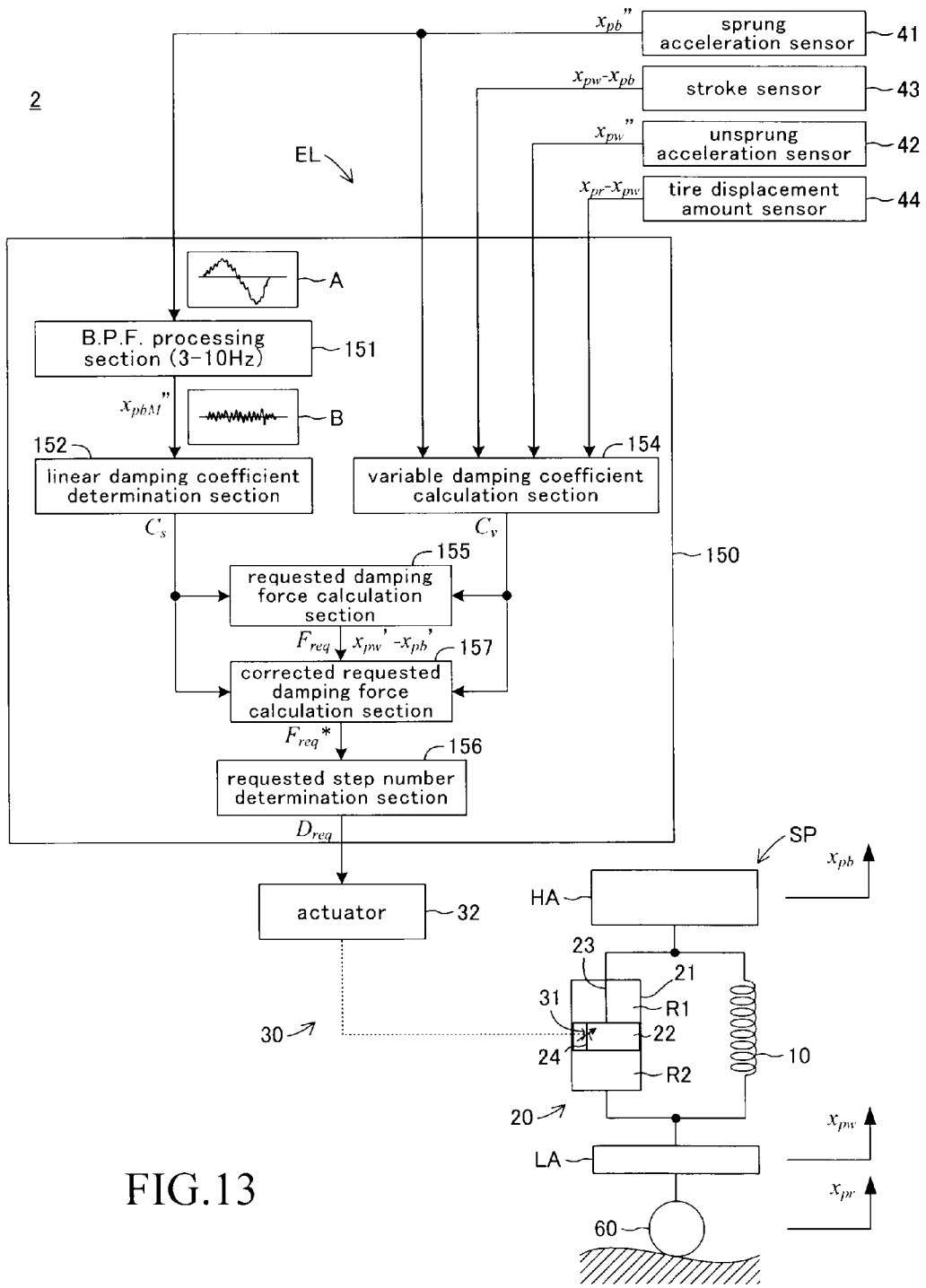
FIG. 13 is a general diagram illustrating an overall suspension control apparatus according to a second embodiment of the present invention.

FIG. 13 is a general diagram illustrating an overall vehicle suspension control apparatus according to a second embodiment of the present invention. A suspension control apparatus 2 includes a suspension apparatus SP and an electric control apparatus EL. The electric control apparatus EL includes various types of sensors and a microcomputer 150. The constituent elements of the suspension control apparatus 2 aside from the microcomputer 150 are the same as the corresponding constituent elements of the suspension control apparatus 1 shown in FIG. 1. Therefore, the constituent elements aside from the microcomputer 150 will be given the same reference numerals as the corresponding elements shown in FIG. 1, and detailed descriptions thereof will be omitted.

As shown in FIG. 13, the microcomputer 150 includes a B.P.F. processing section 151, a linear damping coefficient determination section 152, a variable damping coefficient calculation section 154, a requested damping force calculation section 155, a corrected requested damping force calculation section 157, and a requested step number determination section 156.

The functions of the B.P.F. processing section 151, the linear damping coefficient determination section 152, and the variable damping coefficient calculation section 154 are the same as the respective functions of the B.P.F. processing section 51, the linear damping coefficient determination section 52, and the variable damping coefficient calculation section 54 illustrated in FIG. 1, and thus descriptions thereof will be omitted. The requested damping force calculation section 155 takes the linear damping coefficient $C_s$ and the variable damping coefficient $C_v$ as inputs, and calculates the requested damping force $F_{req}$ based on the inputted damping coefficients. The calculated requested damping force $F_{req}$ and the sprung-unsprung relative speed $x_{pw}' - x_{pb}'$ used in the calculation of the requested damping force $F_{req}$ are then outputted.

The corrected requested damping force calculation section 157 takes the linear damping coefficient $C_s$ from the linear damping coefficient determination section 152, the variable damping coefficient $C_v$ from the variable damping coefficient calculation section 154, and the requested damping force $F_{req}$ and sprung-unsprung relative speed $x_{pw}' - x_{pb}'$ from the requested damping force calculation section 155 as inputs, and calculates a corrected requested damping force $F_{req}^*$ based on the inputted values. This corrected requested damping force $F_{req}^*$ is a damping force in which the requested damping force $F_{req}$ has been corrected based on the magnitude of the linear damping coefficient $C_s$. The calculated corrected requested damping force $F_{req}^*$ is then outputted. The requested step number determination section 156 takes the corrected requested damping force $F_{req}^*$ from the corrected requested damping force calculation section 157 as an input, and determines the requested step number $D_{req}$ based on the inputted corrected requested damping force $F_{req}^*$. A signal corresponding to the determined requested step number $D_{req}$ is then outputted to the actuator 32.

In the suspension control apparatus 2 configured as described above, the damping force control is commenced when a damping force control execution flag has been set to ON. When the damping force control is commenced, the linear damping coefficient determination section 152 of the microcomputer 150 executes the linear damping coefficient determination process, the variable damping coefficient calculation section 154 executes the variable damping coefficient calculation process, the requested damping force calculation section 155 executes the requested damping force calculation process, the corrected requested damping force calculation section 157 executes the corrected requested damping force calculation process, and the requested step number determination section 156 executes the requested step number determination process.

The linear damping coefficient determination process executed by the linear damping coefficient determination section 152 is the same as the process illustrated in the flowchart of FIG. 2. Through this process, the linear damping coefficient $C_s$ is set to be lower the greater the maximum amplitude value α of the intermediate frequency sprung acceleration $x_{pbM}''$ is. The determined linear damping coefficient $C_s$ is then outputted.

Figure 14:
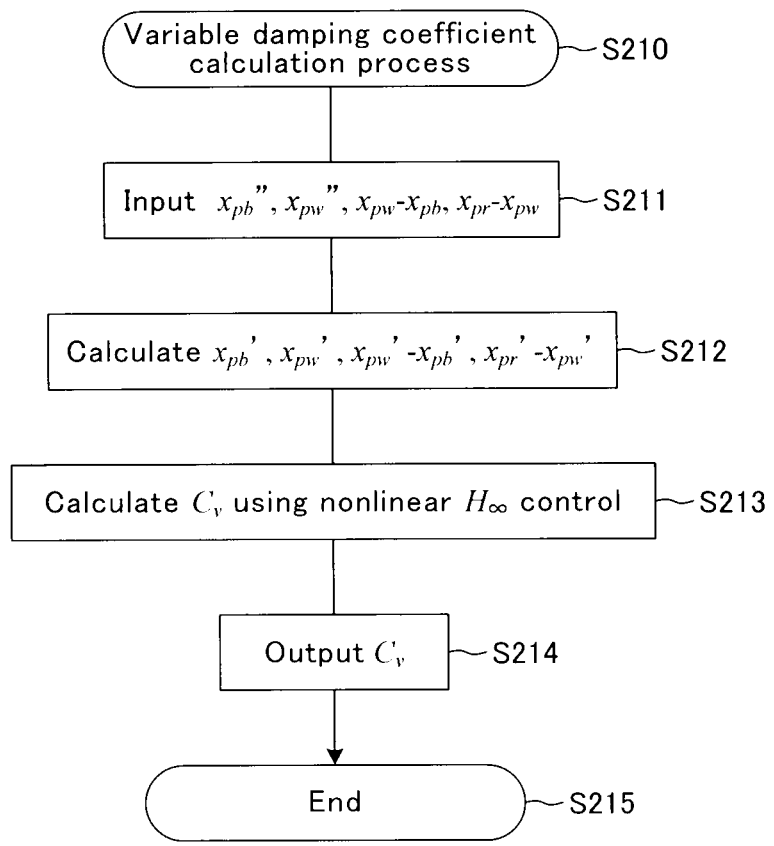
FIG. 14 is a flowchart illustrating the flow of a variable damping coefficient calculation process executed by a variable damping coefficient calculation section according to the second embodiment.

FIG. 14 is a flowchart illustrating the flow of a process executed by the variable damping coefficient calculation section 154. The variable damping coefficient calculation section 154 commences the variable damping coefficient calculation process illustrated in FIG. 14 at S210. Then, in S211, the sprung acceleration $x_{pb}''$, the unsprung acceleration $x_{pw}''$, the sprung-unsprung relative displacement amount $x_{pw}-x_{pb}$, and the unsprung relative displacement amount $x_{pr}-x_{pw}$ are inputted. Next, in S212, the sprung speed $x_{pb}'$, the unsprung speed $x_{pw}'$, the sprung-unsprung relative speed $x_{pw}'-x_{pb}'$, and the unsprung relative speed $x_{pr}'-x_{pw}'$ are calculated.

In S213, the variable damping coefficient calculation section 154 calculates the variable damping coefficient $C_v$ based on the nonlinear H-infinity control theory. The method for calculating the variable damping coefficient $C_v$ is the same as in the first embodiment. However, unlike the aforementioned first embodiment, the nonlinear weight is a predetermined set value. After the variable damping coefficient $C_v$ has been calculated in S213, the variable damping coefficient $C_v$ is outputted in S214. The process then advances to S215, and ends. The variable damping coefficient calculation section 154 corresponds to the variable damping coefficient calculation means according to the present invention.

Figure 15:
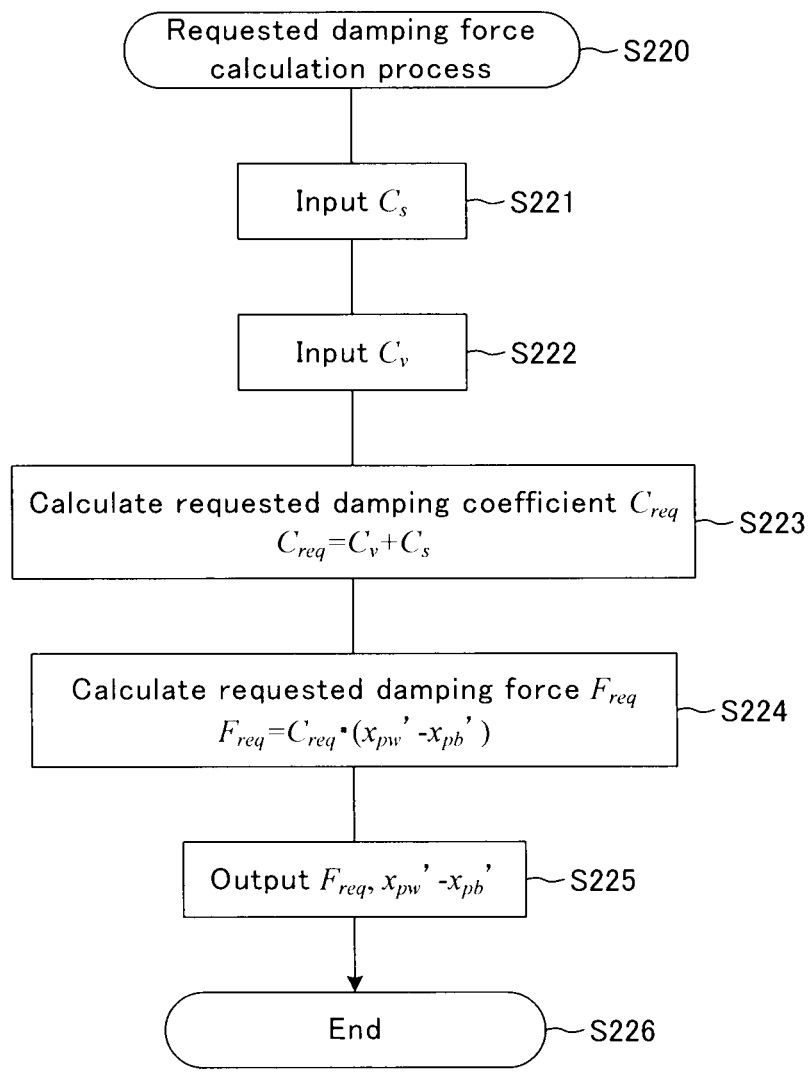
FIG. 15 is a flowchart illustrating the flow of a requested damping force calculation process executed by a requested damping force calculation section according to the second embodiment.

FIG. 15 is a flowchart illustrating the flow of a process executed by the requested damping force calculation section 155. The requested damping force calculation section 155 commences the requested damping force calculation process illustrated in FIG. 15 at S220. Then, in S221, the linear damping coefficient $C_s$ is inputted from the linear damping coefficient determination section 152. Next, in S222, the variable damping coefficient $C_v$ is inputted from the variable damping coefficient calculation section 154. The requested damping coefficient $C_{req}$ is calculated in S223 by adding the linear damping coefficient $C_s$ to the variable damping coefficient $C_v$. After this, in S224, the requested damping force $F_{req}$ is calculated by multiplying the requested damping coefficient $C_{req}$ by the sprung-unsprung relative speed $x_{pw}'-x_{pb}'$. Then, in S225, the requested damping force $F_{req}$ and the sprung-unsprung relative speed $x_{pw}'-x_{pb}'$ used in the calculation of the requested damping force $F_{req}$ are outputted. The process then advances to S226, and ends. The requested damping force calculation section 155 corresponds to the requested damping force calculation means according to the present invention.

Figure 16:
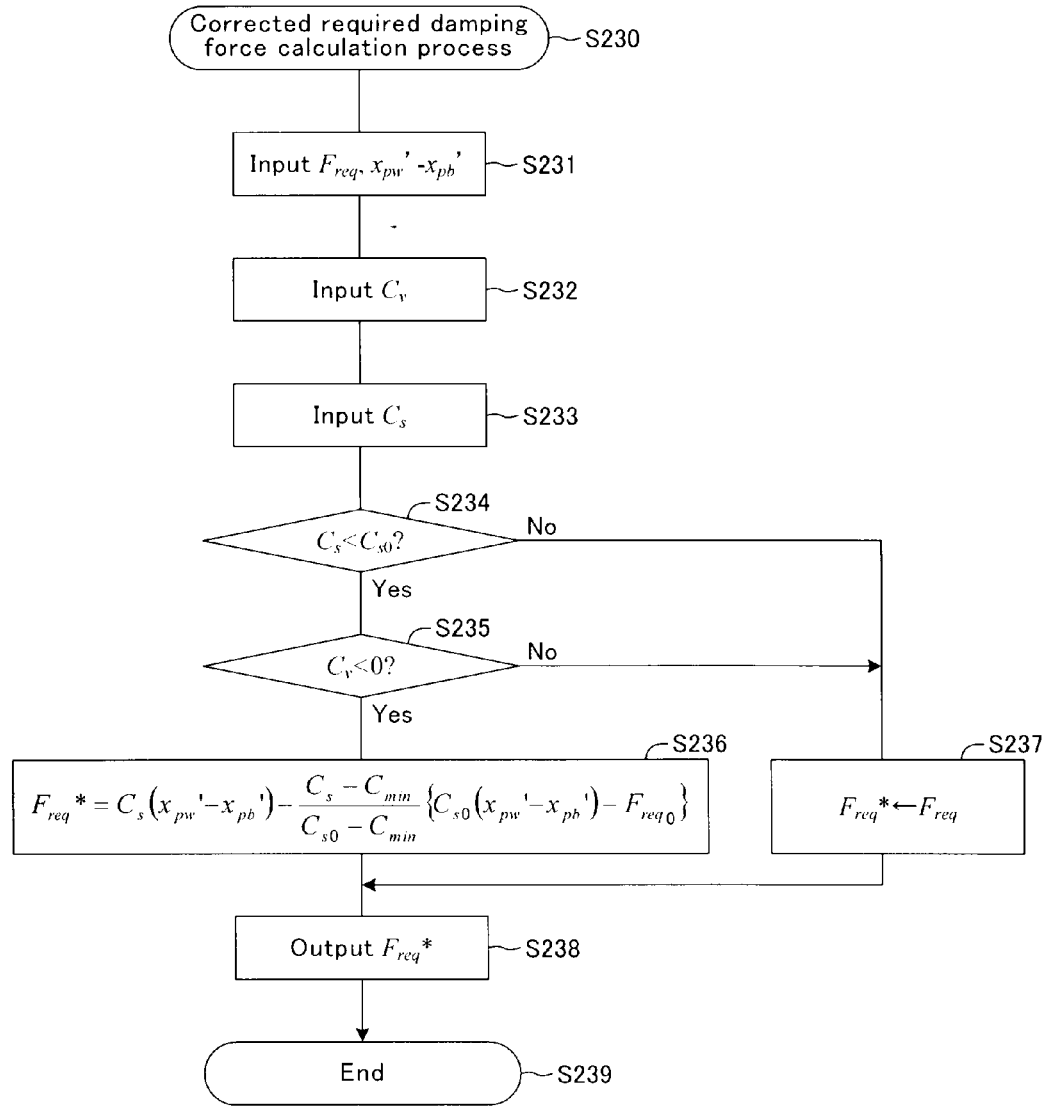
FIG. 16 is a flowchart illustrating the flow of a corrected requested damping force calculation process executed by a corrected requested damping force calculation section according to the second embodiment.

FIG. 16 is a flowchart illustrating the flow of a process executed by the corrected requested damping force calculation section 157. The corrected requested damping force calculation section 157 commences the corrected requested damping force calculation process illustrated in FIG. 16 at S230. Then, in S231, the requested damping force $F_{req}$ and the sprung-unsprung relative speed $x_{pw}'-x_{pb}'$ are inputted from the requested damping force calculation section 155. Next, in S232, the variable damping coefficient $C_v$ is inputted from the variable damping coefficient calculation section 154. Then, in S233, the linear damping coefficient $C_s$ is inputted from the linear damping coefficient determination section 152.

After this, the corrected requested damping force calculation section 157 advances to S234, and determines whether or not the linear damping coefficient $C_s$ is less than a reference linear damping coefficient $C_{s0}$. The reference linear damping coefficient $C_{s0}$ is, when used to calculate the requested damping force, a set value determined in advance so that the Lissajous curve expressing the transition of the requested damping force falls within the range of variation R for the damping force characteristic of the damper 20, and is stored in the microcomputer 150. The reference linear damping coefficient $C_{s0}$ is equivalent to the highest linear damping coefficient of the linear damping coefficients stored in the linear damping coefficient table, or in other words, the reference linear damping coefficient $C_{s0}$ is the linear damping coefficient corresponding to the case where the maximum amplitude value α of the intermediate frequency sprung acceleration $x_{pbM}''$ is 0. Therefore, the linear damping coefficient $C_s$ determined by referring to the linear damping coefficient table is equivalent to the reference linear damping coefficient $C_{s0}$ or is less than the reference linear damping coefficient $C_{s0}$.

When it is determined in S234 that the linear damping coefficient $C_s$ is less than the reference linear damping coefficient $C_{s0}$ (S234: Yes), the process advances to S235. In S235, it is determined whether or not the variable damping coefficient $C_v$ is negative. In the case where it has been determined that the variable damping coefficient $C_v$ is negative (S235: Yes), the process advances to S236. When both the determination result in S234 and the determination result in S235 are Yes, or in other words, when the linear damping coefficient $C_s$ is less than the reference linear damping coefficient $C_{s0}$ and the variable damping coefficient $C_v$ is negative, the calculated requested damping force $F_{req}$ is low. Therefore, there is the risk that the requested damping force $F_{req}$ will drop below the range of variation for the damping force characteristic of the damper 20. Accordingly, the requested damping force is corrected so that the requested damping force does not depart from the range of variation. Specifically, the corrected requested damping force calculation section 157 advances to S236 in the case where the determination results in S234 and S235 are Yes, and calculates the corrected requested damping force $F_{req}^*$ through the following Equation (eq. 14).

$$F_{req}^* = C_s(x_{pw}' - x_{pb}') - \frac{C_s - C_{min}}{C_{s0} - C_{min}}\{C_{s0}(x_{pw}' - x_{pb}') - F_{req0}\} \quad \text{(eq. 14)}$$

In the aforementioned Equation (eq. 14), $C_{min}$ represents a coefficient of the damping force generated by the damper 20 relative to the vibration speed when the number of steps expressing the damping force characteristic of the damper 20 is the minimum step number $D_{min}$ (that is, a minimum damping force; the coefficient is thus a minimum damping coefficient). In addition, $F_{req0}$ is the requested damping force calculated using the reference linear damping coefficient $C_{s0}$ (that is, a reference requested damping force), and can be calculated through the following Equation (eq. 15).

$$F_{req0} = (C_{s0} + C_v)(x'_{pw} - x'_{pb})$$  (eq. 15)

The following Equation (eq. 16) is obtained by substituting the Equation (eq. 15) in the Equation (eq. 14).

$$\begin{aligned} F^*_{req} &= C_s(x'_{pw} - x'_{pb}) - \frac{C_s - C_{min}}{C_{s0} - C_{min}} \\ & \quad \{C_{s0}(x'_{pw} - x'_{pb}) - C_{s0}(x'_{pw} - x'_{pb}) - C_v(x'_{pw} - x'_{pb})\} \\ &= C_s(x'_{pw} - x'_{pb}) + \\ & \quad C_v \frac{(C_{s0} - C_{min}) - (C_{s0} - C_s)}{C_{s0} - C_{min}}(x'_{pw} - x'_{pb}) \\ &= C_s(x'_{pw} - x'_{pb}) + C_v(x'_{pw} - x'_{pb}) - \\ & \quad C_v\left(\frac{C_{s0} - C_s}{C_{s0} - C_{min}}\right)(x'_{pw} - x'_{pb}) \\ &= F_{req} - C_v \frac{C_{s0} - C_s}{C_{s0} - C_{min}}(x'_{pw} - x'_{pb}) \end{aligned}$$  (eq. 16)

As can be seen from the Equation (eq. 16), the corrected requested damping force $F^*_{req}$ is a damping force in which the requested damping force $F_{req}$ has been corrected, by subtracting $C_v((C_{s0}-C_s)/(C_{s0}-C_{min}))(x'_{pw}-x'_{pb})$ from the requested damping force $F_{req}$ calculated by the requested damping force calculation section 155. Furthermore, because the linear damping coefficient $C_s$ is included in the right side of the Equation (eq. 16), it can be seen that the corrected requested damping force $F^*_{req}$ corrects the requested damping force $F_{req}$ in accordance with the magnitude of the linear damping coefficient $C_s$. Furthermore, it can be seen that the corrected requested damping force $F^*_{req}$ corrects the requested damping force $F_{req}$ based on the ratio $(C_{s0}-C_s)/(C_{s0}-C_{min})$, which is the ratio of the difference between the reference linear damping coefficient $C_{s0}$ and the minimum damping coefficient $C_{min}$ ($C_{s0}-C_{min}$) to the difference between the reference linear damping coefficient $C_{s0}$ and the linear damping coefficient $C_s$ ($C_{s0}-C_s$).

After the corrected requested damping force $F^*_{req}$ has been calculated through the Equation (eq. 14) in S236, the corrected requested damping force calculation section 157 advances to S238, and outputs the corrected requested damping force $F^*_{req}$. The process then advances to S239, and ends.

Meanwhile, in the case where the determination result of S235 is No, the process advances to S237. In the case where the determination result of S235 is No, or in other words, in the case where the variable damping coefficient $C_v$ is positive, the requested damping force $F_{req}$ is greater than the linear damping force, and thus there is no risk of the requested damping force $F_{req}$ dropping below the range of variation R for the damping force characteristic of the damper 20. In other words, it is not necessary to correct the requested damping force $F_{req}$. Therefore, when the determination result of S235 is No, in S237, the requested damping force $F_{req}$ is substituted as-is for the corrected requested damping force $F^*_{req}$. Next, in S238, the corrected requested damping force $F^*_{req}$ is outputted. The process then advances to S239, and ends.

In the case where the determination result of S234 is No, the process advances to S237. In the case where the determination result of S234 is No, the linear damping coefficient $C_s$ is not lower than the reference linear damping coefficient $C_{s0}$. In this case, the linear damping coefficient $C_s$ is equal to the reference linear damping coefficient $C_{s0}$. Because the reference requested damping force $F_{req0}$ calculated using the reference linear damping coefficient $C_{s0}$ is a damping force that is within the range of variation for the damping force characteristic of the damper 20, it is not necessary to correct the requested damping force when the determination result of S234 is No. Therefore, in S237, the requested damping force $F_{req}$ is substituted as-is for the corrected requested damping force $F^*_{req}$. Next, in S238, the corrected requested damping force $F^*_{req}$ is outputted, after which the process advances to S239 and ends. The corrected requested damping force calculation section 157 corresponds to a corrected requested damping force calculation means according to the present invention.

The requested step number determination process executed by the requested step number determination section 156 is basically the same as the requested step number determination process executed by the requested step number determination section 56 according to the first embodiment illustrated in FIG. 6. However, in the present embodiment, the corrected requested damping force $F^*_{req}$ is inputted instead of the requested damping force $F_{req}$ in S151 of FIG. 6. The other steps are the same as those illustrated in FIG. 6 and thus descriptions thereof will be omitted.

As described earlier, in the present embodiment, the damping force characteristic of the damper 20 is controlled based on the corrected requested damping force $F^*_{req}$, obtained by correcting the requested damping force $F_{req}$. The effects of this correction will be described hereinafter.

Figure 17:
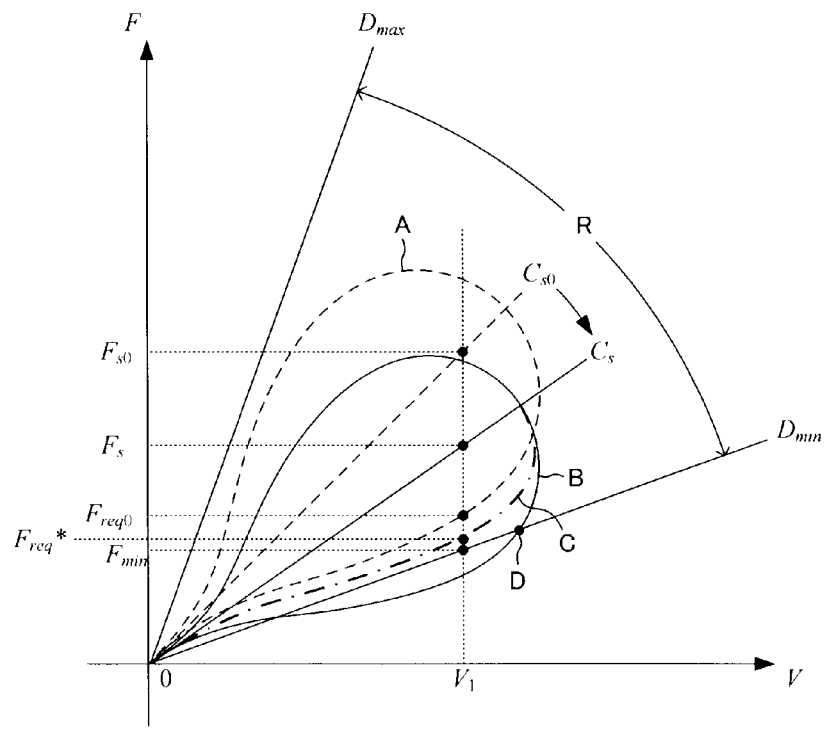
FIG. 17 is a damping force characteristic graph illustrating a Lissajous curve expressing the transition of a required damping force and a range of variation of the damping force represented by the damping force characteristic of a damper.

FIG. 17 is a damping force characteristic graph illustrating a Lissajous curve expressing the transition of a requested damping force and a range of variation R in the damping force characteristic of the damper 20. A Lissajous curve A indicated by the broken line in the graph expresses the transition of the reference requested damping force $F_{req0}$, which is the requested damping force calculated when the linear damping coefficient is equal to the reference linear damping coefficient $C_{s0}$. This reference requested damping force $F_{req0}$ is equal to the requested damping force calculated when the intermediate frequency sprung acceleration is 0, or in other words, when the maximum amplitude value α of the intermediate frequency sprung acceleration is 0. Meanwhile, a Lissajous curve B indicated by the solid line in the graph expresses the transition of the requested damping force $F_{req}$ calculated using the linear damping coefficient $C_s$ determined by the linear damping coefficient determination section 152 when the maximum amplitude value α of the intermediate frequency sprung acceleration is high. The linear damping coefficient $C_s$ is lower than the reference linear damping coefficient $C_{s0}$.

As shown in the graph, the Lissajous curve A falls within the range of variation R for the damping force characteristic of the damper 20. However, a lower portion of the Lissajous curve B falls outside of the range of variation R. In this manner, when the linear damping coefficient has been changed from the reference linear damping coefficient $C_{s0}$ to the value $C_s$ that is lower than $C_{s0}$, there is the risk that the Lissajous curve expressing the transition of the requested damping force will extend outside of the range of variation R for the damping force characteristic of the damper 20. The requested damping force $F_{req}$ corresponding to the portion that falls outside of the range of variation R transitions below the lower limit (the damping force characteristic line expressed by $D_{min}$) for the damping force characteristic of the damper 20. When the requested damping force $F_{req}$ follows below the low limit, there is a problem in that the damping force changes suddenly (discontinuously) at the location of the point D in the graph, which imparts a sense of discomfort on the occupant.

As opposed to this, in the present embodiment, the requested damping force is corrected so that the portion of the Lissajous curve B that is below the damping force characteristic line expressed by the linear damping coefficient $C_s$, or in other words, the region in which the variable damping coefficient $C_v$ is negative, becomes a curve as indicated by the dot-dash line C in the graph. The curve indicated by the dot-dash line C expresses the transition of the corrected requested damping force $F_{req}^*$ calculated through the aforementioned Equation (eq. 14). As can be seen from the graph, the curve C transitions within the range of variation R for the damping force characteristic of the damper 20.

The corrected requested damping force $F_{req}^*$ calculated through the Equation (eq. 14) is without fail a damping force that falls within the range of variation R for the damping force characteristic of the damper 20. The reason for this will be described hereinafter. As shown in FIG. 17, the corrected requested damping force $F_{req}^*$ calculated when, for example, the sprung-unsprung relative speed is $V_1$ can be found through the following Equation (eq. 17) by substituting $V_1$ for the sprung-unsprung relative speed $x_{pw}{'} - x_{pb}{'}$ in the Equation (eq. 14).

$$F_{req}^* = C_s V_1 - \frac{C_s - C_{min}}{C_{s0} - C_{min}}(C_{s0} V_1 - F_{req0}) \quad \text{(eq. 17)}$$

The Equation (eq. 17) can be rewritten as indicated in the following Equation (eq. 18).

$$F_{req}^* = C_s V_1 - \frac{C_s V_1 - C_{min} V_1}{C_{s0} V_1 - C_{min} V_1}(C_{s0} V_1 - F_{req0}) \quad \text{(eq. 18)}$$
$$= F_s - \frac{F_s - F_{min}}{F_{s0} - F_{min}}(F_{s0} - F_{req0})$$

In the Equation (eq. 18), $F_s$ represents the linear damping force obtained by multiplying the sprung-unsprung relative speed $V_1$ by the linear damping coefficient $C_s$, $F_{s0}$ represents the reference linear damping force obtained by multiplying the sprung-unsprung relative speed $V_1$ by the reference linear damping coefficient $C_{s0}$, and $F_{min}$ represents the minimum damping force obtained by multiplying the sprung-unsprung relative speed $V_1$ by the minimum damping coefficient $C_{min}$.

Furthermore, in the Equation (eq. 18), $(F_s - F_{min})/(F_{s0} - F_{min})$ expresses a ratio of the difference between the reference linear damping force $F_{s0}$ and the minimum damping force $F_{min}$ (a reference damping force difference) to the difference between the linear damping force $F_s$ and the minimum damping force $F_{min}$ (a comparative damping force difference) (that is, a differential damping ratio). The corrected requested damping force $F_{req}^*$ is calculated based on this differential damping ratio. When the differential damping ratio is represented by G, the Equation (eq. 18) can be rewritten as the following Equation (eq. 19).

$$F_{req}^* = F_s - G(F_{s0} - F_{req0}) \quad \text{(eq. 19)}$$

Therefore, it can also be said that the corrected requested damping coefficient $F_{req}^*$ is calculated through the aforementioned Equation (eq. 19).

The Equation (eq. 19) can also be rewritten as indicated in the following Equation (eq. 20).

$$\frac{F_s - F_{req}^*}{F_s - F_{min}} = \frac{F_{s0} - F_{req0}}{F_{s0} - F_{min}} \quad \text{(eq. 20)}$$

The right side of the Equation (eq. 20) expresses a ratio of the difference between the reference linear damping force $F_{s0}$ and the minimum damping force $F_{min}$ to the difference between the reference linear damping force $F_{s0}$ and the reference requested damping force $F_{req0}$. Meanwhile, the left side of the Equation (eq. 20) expresses a ratio of the difference between the linear damping force $F_s$ and the minimum damping force $F_{min}$ to the difference between the linear damping force $F_s$ and the corrected requested damping force $F_{req}^*$.

Figure 18:
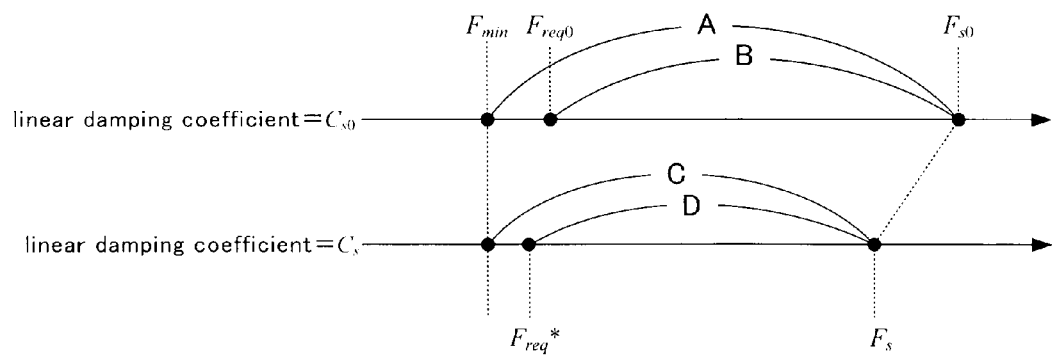
FIG. 18 is a schematic diagram illustrating relationships between damping forces used in the calculation of a corrected requested damping force.

FIG. 18 is a schematic diagram illustrating the relationship between the respective damping force differences indicated in the Equation (eq. 20). In this diagram, A indicates the difference between the reference linear damping force $F_{s0}$ and the minimum damping force $F_{min}$, and B indicates the difference between the reference linear damping force $F_{s0}$ and the reference requested damping force $F_{req0}$. Likewise, C indicates the difference between the linear damping force $F_s$ and the minimum damping force $F_{min}$, and D indicates the difference between the linear damping force $F_s$ and the corrected requested damping force $F_{req}^*$. In the case where the Equation (eq. 20) holds true, B/A=D/C.

The reference requested damping force $F_{req0}$ is calculated using the reference linear damping coefficient $C_{s0}$, and thus this damping force does not drop below the minimum damping force $F_{min}$. Therefore, as shown in FIG. 18, the difference B is lower than the difference A, and thus B/A is less than 1. If B/A is less than 1, then D/C is also less than 1. Accordingly, the corrected requested damping force $F_{req}^*$ is greater than the minimum damping force $F_{min}$. For this reason, the corrected requested damping force $F_{req}^*$ falls within the range of variation for the damping force characteristic of the damper.

Furthermore, by calculating the corrected requested damping force $F_{req}^*$ through the aforementioned Equation (eq. 14) or (eq. 19), the relationship between the damping forces indicated in FIG. 18 is maintained. It is therefore possible to calculate the corrected requested damping force $F_{req}^*$ so that the trend of the transition of the requested damping force within the range of variation R matches the trend of the transition of the reference requested damping force $F_{req0}$.

As described thus far, according to the present embodiment, the linear damping coefficient $C_s$ is set to a low value when vibrations caused by the intermediate frequency sprung acceleration are great. Therefore, degradation in the riding quality caused by the input of such vibrations is suppressed. Furthermore, the requested damping force $F_{req}$ is corrected when there is the risk that the requested damping force $F_{req}$ will depart from the range of variation R for the damping force characteristic of the damper 20 due to the linear damping coefficient $C_s$ being changed to a low value. This correction makes it possible to keep a Lissajous curve expressing the transitions of the corrected requested damping force $F_{req}^*$ within the range of variation R.

In the stated second embodiment, the reference linear damping coefficient $C_{s0}$ is equal to the greatest linear damping coefficient determined by the linear damping coefficient determination section 152. However, the reference linear damping coefficient $C_{s0}$ can be set to any value that meets the condition of the Lissajous curve expressing the transition of the requested damping force calculated using the reference linear damping coefficient $C_{s0}$ falling within the range of variation R for the damping force characteristic of the damper 20. As long as the reference linear damping coefficient $C_{s0}$ meets this condition, the corrected requested damping force $F_{req}{}^*$ corresponds to a damping force within the range of variation R for the damping force characteristic of the damper 20.

Note that the aforementioned example is an example in which the requested damping force $F_{req}$ is corrected so that the requested damping force $F_{req}$ does not drop below the lower limit of the damping force characteristic of the damper 20 when the linear damping coefficient $C_s$ has been set to a lower value than the reference linear damping coefficient $C_{s0}$. In the same manner, the requested damping force $F_{req}$ can be corrected so that the requested damping force $F_{req}$ does not exceed the upper limit of the damping force characteristic of the damper 20 when the linear damping coefficient $C_s$ is set to a greater value than the reference linear damping coefficient $C_{s0}$. In this case, the corrected requested damping force $F_{req}{}^*$ is calculated using the following Equation (eq. 21) instead of the aforementioned Equation (eq. 14).

$$F_{req}^* = C_s(x'_{pw} - x'_{pb}) - \frac{C_{max} - C_s}{C_{max} - C_{s0}}\{C_{s0}(x'_{pw} - x'_{pb}) - F_{req_0}\} \quad \text{(eq. 21)}$$

In the Equation (eq. 21), $C_{max}$ represents a coefficient of the damping force generated by the damper 20 relative to the vibration speed when the step number expressing the damping force characteristic of the damper 20 is the maximum step number $D_{max}$. Furthermore, the correction of the requested damping force carried out using the Equation (eq. 21) is performed when both the linear damping coefficient $C_s$ is greater than the reference linear damping coefficient $C_{s0}$ and the variable damping coefficient $C_v$ is positive. In other words, the inequality signs in the criterion formula indicated in S234 and S235 of FIG. 16 are reversed. Furthermore, in the case where there is the risk that the requested damping force will exceed both the upper limit and the lower limit of the damping force characteristic of the damper 20, the requested damping force may be corrected by employing the correction of the Equation (eq. 14) and the correction of the Equation (eq. 21) together.

Third Embodiment

Next, a third embodiment of the present invention will be described. The damping force control apparatus described in the present embodiment simultaneously controls the damping forces generated by the dampers in respective four suspension apparatuses so as to dampen vibrations in control target locations of the sprung member HA caused by heave motion (vertical motion), roll motion, and pitch motion in the sprung member HA, by applying the nonlinear H-infinity control theory to a control system designed based on the motion of four suspension apparatuses attached to the left- and right-front and left- and right-rear of the sprung member HA.

Figure 19:
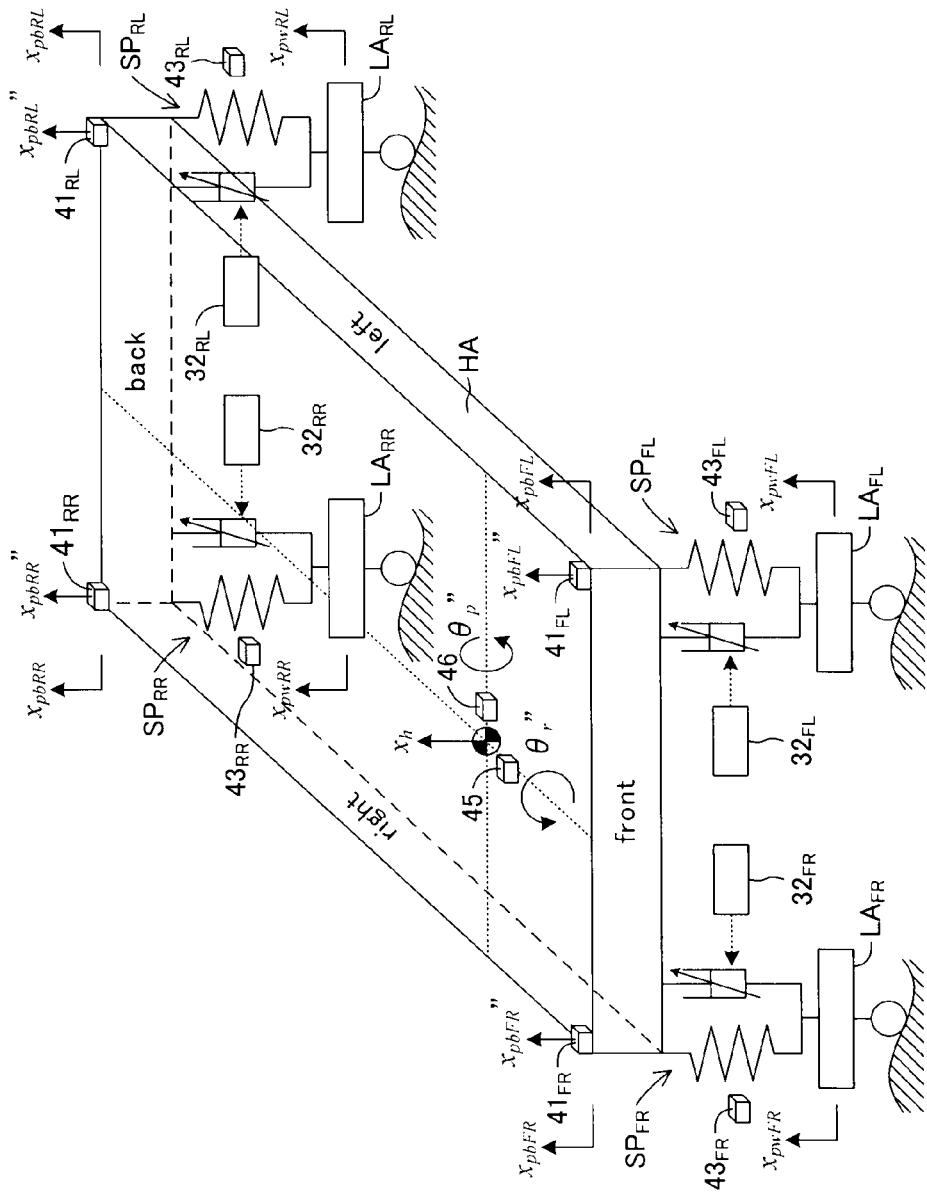
FIG. 19 is a diagram illustrating a vehicle model in which four suspension apparatuses are attached to the left-front, right-front, left-rear, and right-rear of a sprung member, according to a third embodiment of the present invention.

FIG. 19 is a diagram illustrating a vehicle model (a four-wheel model) in which four suspension apparatuses $SP_{FR}$, $SP_{FL}$, $SP_{RR}$, and $SP_{RL}$ are attached to the sprung member HA at the left- and right-front and left- and right-rear thereof. As shown in the diagram, the suspension apparatus $SP_{FR}$ is attached to the right-front location of the sprung member HA, the suspension apparatus $SP_{FL}$ is attached to the left-front location of the sprung member HA, the suspension apparatus $SP_{RR}$ is attached to the right-rear location of the sprung member HA, and the suspension apparatus $SP_{RL}$ is attached to the left-rear location of the sprung member HA. Each suspension apparatus includes a spring and a damper whose damping force characteristic can be changed. The damping force characteristics of the dampers provided in the respective suspension apparatuses $SP_{FR}$, $SP_{FL}$, $SP_{RR}$, and $SP_{RL}$ can be changed through the operation of valves provided within those dampers, which are in turn operated by actuators $32_{FR}$, $32_{FL}$, $32_{RR}$, and $32_{RL}$.

Furthermore, sprung acceleration sensors $41_{FR}$, $41_{FL}$, $41_{RR}$, and $41_{RL}$, a roll angle acceleration sensor 45, and a pitch angle acceleration sensor 46 are attached to the sprung member HA. The sprung acceleration sensor $41_{FR}$ detects a vertical acceleration $x_{pbFR}''$ at the right-front location of the sprung member HA, the sprung acceleration sensor $41_{FL}$ detects a vertical acceleration $x_{pbFL}''$ at the left-front location of the sprung member HA, the sprung acceleration sensor $41_{RR}$ detects a vertical acceleration $x_{pbRR}''$ at the right-rear location of the sprung member HA, and the sprung acceleration sensor $41_{RL}$ detects a vertical acceleration $x_{pbRL}''$ at the left-rear location of the sprung member HA. The roll angle acceleration sensor 45 detects a roll angle acceleration $\theta_r''$, which is the angle acceleration of a control target location of the sprung member HA in the roll direction (the direction around the front-to-back axis). The pitch angle acceleration sensor 46 detects a pitch angle acceleration $\theta_p''$, which is the angle acceleration of a control target location of the sprung member HA in the pitch direction (the direction around the left-to-right axis).

Furthermore, stroke sensors $43_{FR}$, $43_{FL}$, $43_{RR}$, and $43_{RL}$ are attached to the suspension apparatuses $SP_{FR}$, $SP_{FL}$, $SP_{RR}$, and $SP_{RL}$, respectively. By measuring the relative displacement amount of the piston disposed within the damper of the suspension apparatus $SP_{FR}$, the stroke sensor $43_{FR}$ detects a sprung-unsprung relative displacement amount $x_{pwFR} - x_{pbFR}$, which is the difference between a vertical displacement amount $x_{pbFR}$ at the right-front location of the sprung member HA and a vertical displacement amount $x_{pwFR}$ of the unsprung member $LA_{FR}$ connected to the suspension apparatus $SP_{FR}$. Meanwhile, the stroke sensor $43_{FL}$ detects a sprung-unsprung relative displacement amount $x_{pwFL} - x_{pbFL}$, which is the difference between a vertical displacement amount $x_{pbFL}$ at the left-front location of the sprung member HA and a vertical displacement amount $x_{pwFL}$ of the unsprung member $LA_{FL}$ connected to the suspension apparatus $SP_{FL}$. Likewise, the stroke sensor $43_{RR}$ detects a sprung-unsprung relative displacement amount $x_{pwRR} - x_{pbRR}$, which is the difference between a vertical displacement amount $x_{pbRR}$ at the right-rear location of the sprung member HA and a vertical displacement amount $x_{pwRR}$ of the unsprung member $LA_{RR}$ connected to the suspension apparatus $SP_{RR}$. Finally, the stroke sensor $43_{RL}$ detects a sprung-unsprung relative displacement amount $x_{pwRL} - x_{pbRL}$, which is the difference between a vertical displacement amount $x_{pbRL}$ at the left-rear location of the sprung member HA and a vertical displacement amount $x_{pwRL}$ of the unsprung member $LA_{RL}$ connected to the suspension apparatus $SP_{RL}$.

Figure 20:
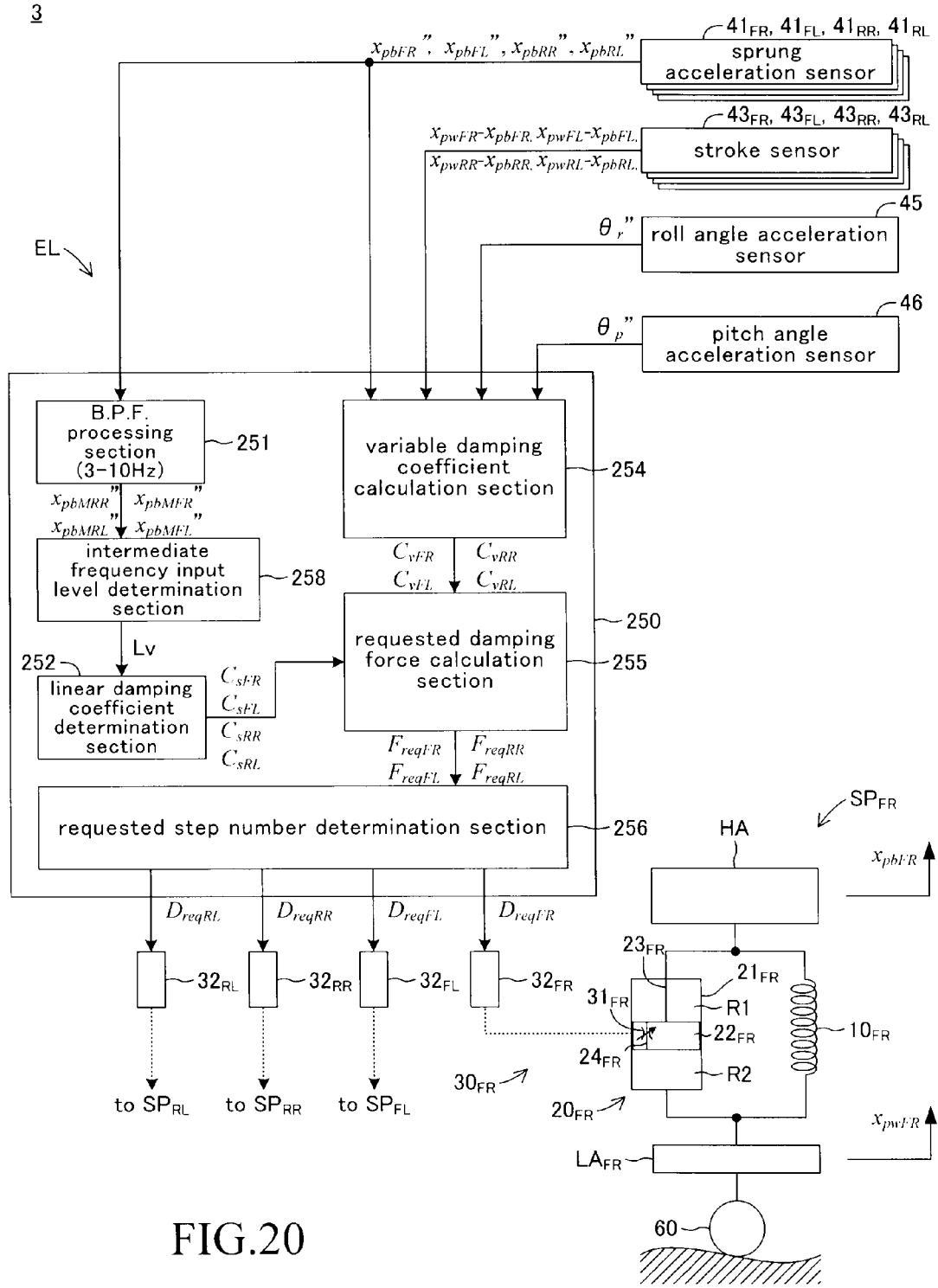
FIG. 20 is a general diagram illustrating the overall configuration of a suspension control apparatus according to the third embodiment.

FIG. 20 is a general diagram illustrating the overall configuration of a suspension control apparatus 3 according to the present embodiment. This suspension control apparatus 3 includes the suspension apparatuses $SP_{FR}$, $SP_{FL}$, $SP_{RR}$, and $SP_{RL}$ and the electric control apparatus EL. Note that the suspension apparatus $SP_{FR}$ is illustrated in the diagram as a representative example, and the other suspension apparatuses $SP_{FL}$, $SP_{RR}$, and $SP_{RL}$ are not shown. Furthermore, because the configuration of the suspension apparatus $SP_{FR}$ is the same as the configuration of the suspension apparatus SP illustrated in FIG. 1, detailed descriptions thereof will be omitted.

The electric control apparatus EL includes the aforementioned sensors and a microcomputer 250, which corresponds to the damping force control apparatus according to the present invention. The values detected by the various sensors are inputted into the microcomputer 250. Based on the inputted detected values, the microcomputer 250 outputs, to the respective actuators $32_{FR}$, $32_{FL}$, $32_{RR}$, and $32_{RL}$, requested step numbers $D_{reqFR}$, $D_{reqFL}$, $D_{reqRR}$, and $D_{reqRL}$, which are control target step numbers for the respective dampers provided in the suspension apparatuses $SP_{FL}$, $SP_{FR}$, $SP_{RL}$, and $SP_{RR}$. Each actuator operates so that a step number expressing the damping force characteristic of the damper in the corresponding suspension apparatus equals the requested step number. Through this, the damping forces generated by the dampers in the respective suspension apparatuses are controlled simultaneously.

The microcomputer 250 includes a B.P.F. processing section 251, an intermediate frequency input level determination section 258, a linear damping coefficient determination section 252, a variable damping coefficient calculation section 254, a requested damping force calculation section 255, and a requested step number determination section 256. The B.P.F. processing section 251 takes the sprung accelerations $x_{pbFR}''$, $x_{pbFL}''$, $x_{pbRR}''$, and $x_{pbRL}''$ detected by the sprung acceleration sensors $41_{FR}$, $41_{FL}$, $41_{RR}$, and $41_{RL}$ as inputs, and executes a band pass filter process on the inputted sprung accelerations $x_{pbFR}''$, $x_{pbFL}''$, $x_{pbRR}''$, and $x_{pbRL}''$. Through this process, sprung accelerations $x_{pbMFR}''$, $x_{PbMFL}''$, $x_{pbMRR}''$, and $x_{pbMRL}''$ for a vibration frequency from 3 to 10 Hz are outputted.

The intermediate frequency input level determination section 258 takes the intermediate frequency sprung accelerations $x_{pbMFR}''$, $x_{pbMFL}''$, $x_{pbmRR}''$, and $x_{pbMRL}''$ that have passed through the B.P.F. processing section 251 as inputs, and determines an intermediate frequency input level Lv expressing the magnitude of the intermediate frequency sprung acceleration. The determined intermediate frequency input level Lv is then outputted. The linear damping coefficient determination section 252 takes the intermediate frequency input level Lv as an input, and based on that level Lv, determines linear damping coefficients $C_{sFR}$, $C_{sFL}$, $C_{sRR}$, and $C_{sRL}$ for the linear damping forces to be generated by the dampers in the four respective suspension apparatuses $SP_{FR}$, $SP_{FL}$, $SP_{RR}$, and $SP_{RL}$. The determined linear damping coefficients $C_{sFR}$, $C_{sFL}$, $C_{sRR}$, and $C_{sRL}$ are then outputted.

The variable damping coefficient calculation section 254 takes the sensor values from the various sensors as inputs, and based on the input values and on the nonlinear H-infinity control theory, calculates variable damping coefficients $C_{vFR}$, $C_{vFL}$, $C_{vRR}$, and $C_{vRL}$ for the variable damping forces to be generated by the dampers in the four respective suspension apparatuses $SP_{FR}$, $SP_{FL}$, $SP_{RR}$, and $SP_{RL}$. The calculated variable damping coefficients $C_{vFR}$, $C_{vFL}$, $C_{vRR}$, and $C_{vRL}$ are then outputted.

The requested damping force calculation section 255 takes the linear damping coefficients $C_{sFR}$, $C_{sFL}$, $C_{sRR}$, and $C_{sRL}$ and the variable damping coefficients $C_{vFR}$, $C_{vFL}$, $C_{vRR}$, and $C_{vRL}$ as inputs, and from these inputted damping coefficients, calculates requested damping forces $F_{reqFR}$, $F_{reqFL}$, $F_{reqRR}$, and $F_{reqRL}$, which are target damping forces to be generated by the dampers in the four respective suspension apparatuses $SP_{FR}$, $SP_{FL}$, $SP_{RR}$, and $SP_{RL}$. The calculated requested damping forces $F_{reqFR}$, $F_{reqFL}$, $F_{reqRR}$, and $F_{reqRL}$ are then outputted. The requested step number determination section 256 takes the requested damping forces $F_{reqFR}$, $F_{reqFL}$, $F_{reqRR}$, and $F_{reqRL}$ as inputs, and based on the inputted requested damping forces, calculates the requested step numbers $D_{reqFR}$, $D_{reqFL}$, $D_{reqRR}$, and $D_{reqRL}$, which are the target step numbers for the damping force characteristics of the dampers in the four respective suspension apparatuses $SP_{FR}$, $SP_{FL}$, $SP_{RR}$, and $SP_{RL}$. The calculated requested step numbers $D_{reqFR}$, $D_{reqFL}$, $D_{reqRR}$, and $D_{reqRL}$ are then outputted to the actuators $32_{FR}$, $32_{FL}$, $32_{RR}$, and $32_{RL}$ that correspond thereto.

In the suspension control apparatus 3 configured as described thus far, in the case where, for example, one of the sprung accelerations $x_{pbFR}''$, $x_{pbFL}''$, $x_{pbRR}''$, and $x_{pbRL}''$ exceeds a predetermined threshold, a damping force control execution flag is set to ON. As a result, the damping force control is commenced, and the intermediate frequency input level determination section 258 executes the process illustrated in FIG. 21, the linear damping coefficient determination section 252 executes the process illustrated in FIG. 22, the variable damping coefficient calculation section 254 executes the process illustrated in FIG. 23, the requested damping force calculation section 255 executes the process illustrated in FIG. 24, and the requested step number determination section executes the process illustrated in FIG. 25, every predetermined short amount of time.

Figure 21:
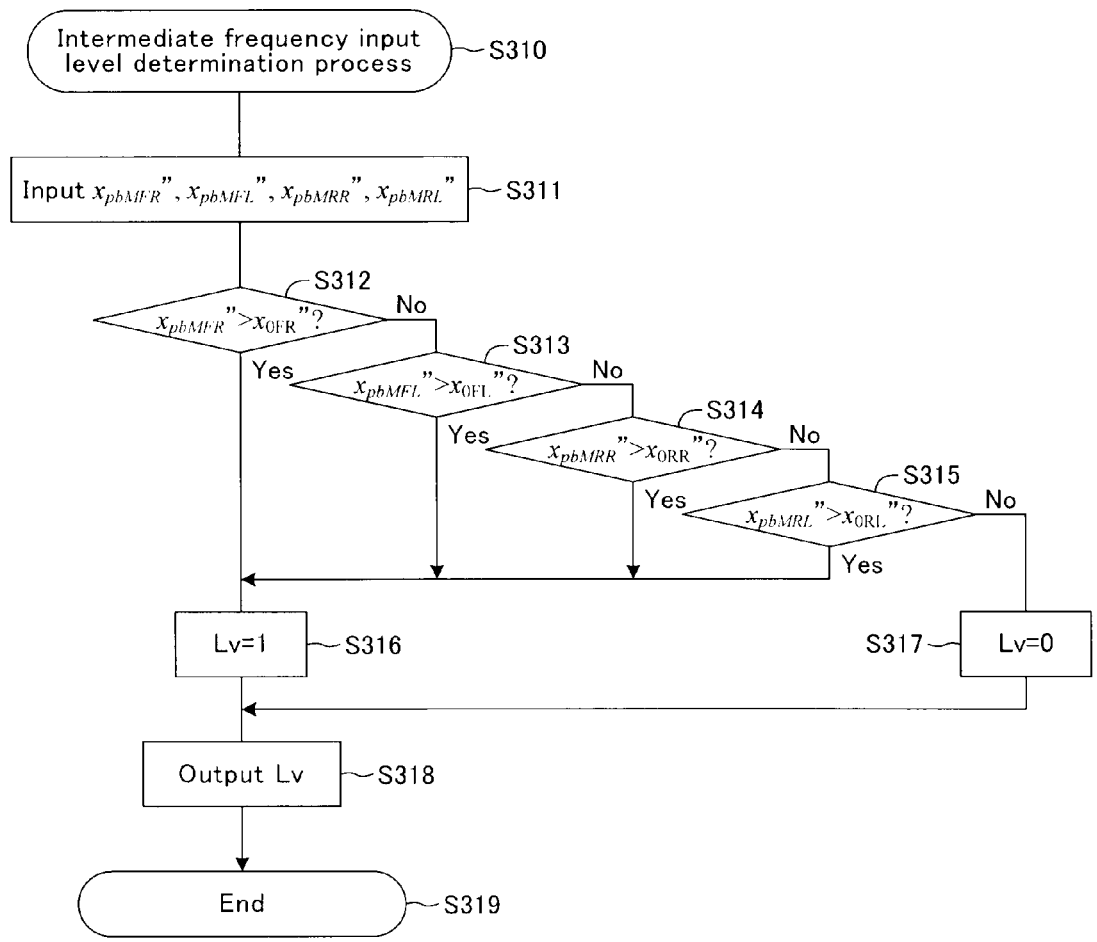
FIG. 21 is a flowchart illustrating the flow of an intermediate frequency input level determination process executed by an intermediate frequency input level determination section according to the third embodiment.

FIG. 21 is a flowchart illustrating the flow of a process executed by the intermediate frequency input level determination section 258. The intermediate frequency input level determination section 258 commences the intermediate frequency input level determination process shown in FIG. 21 in S310. Then, in S311, the intermediate frequency sprung accelerations $x_{pbMFR}''$, $x_{pbMFL}''$, $x_{pbMRR}''$, and $x_{pbMRL}''$ that have passed through the B.P.F. processing section 251 are inputted. Next, in S312, it is determined whether or not the intermediate frequency sprung acceleration $x_{pbMFR}''$ is greater than a reference acceleration $x_{0FR}''$. When the determination result is Yes, the process advances to S316, whereas when the determination result is No, the process advances to S313. In S313, it is determined whether or not the intermediate frequency sprung acceleration $x_{pbMFL}''$ is greater than a reference acceleration $x_{0FL}''$. When the determination result is Yes, the process advances to S316, whereas when the determination result is No, the process advances to S314. In S314, it is determined whether or not the intermediate frequency sprung acceleration $x_{pbMRR}''$ is greater than a reference acceleration $x_{0RR}''$. When the determination result is Yes, the process advances to S316, whereas when the determination result is No, the process advances to S315. In S315, it is determined whether or not the intermediate frequency sprung acceleration $x_{pbMRL}''$ is greater than a reference acceleration $x_{0RL}''$. When the determination result is Yes, the process advances to S316, whereas when the determination result is No, the process advances to S317.

When at least one of the determination results of S312 through S315 is Yes, the intermediate frequency input level determination section 258 advances to S316, and sets the intermediate frequency input level Lv to 1. However, when all of the determination results of S312 through S315 are No, the intermediate frequency input level determination section 258 advances to S317, and sets the intermediate frequency input level Lv to 0. Note that the reference accelerations $x_{0FR}''$, $x_{0FL}''$, $x_{0RR}''$, and $x_{0RL}''$ are threshold accelerations for determining whether or not control for suppressing vibrations caused by sprung acceleration having the frequency within the intermediate frequency band (that is, control for suppressing a degradation in the riding quality) is necessary. Therefore, in the present embodiment, the intermediate frequency input level Lv is set to 1 when at least one of the intermediate frequency sprung accelerations $x_{pbMFR}''$, $x_{pbMFL}''$, $x_{pbMRR}''$, and $x_{pbMRL}''$ has exceeded its respective threshold, whereas the intermediate frequency input level Lv is set to 0 when none have exceeded their respective thresholds. An intermediate frequency input level Lv of 1 indicates that the inputted intermediate frequency sprung acceleration is high, whereas when an intermediate frequency input level Lv of 0 indicates that the inputted intermediate frequency sprung acceleration is low, or that no intermediate frequency sprung acceleration is inputted.

After setting the intermediate frequency input level Lv in S316 or S317, the intermediate frequency input level determination section 258 advances the process to S318, and outputs the set intermediate frequency input level Lv. The process then advances to S319, and ends. The outputted intermediate frequency input level Lv is inputted into the linear damping coefficient determination section 252.

Figure 22:
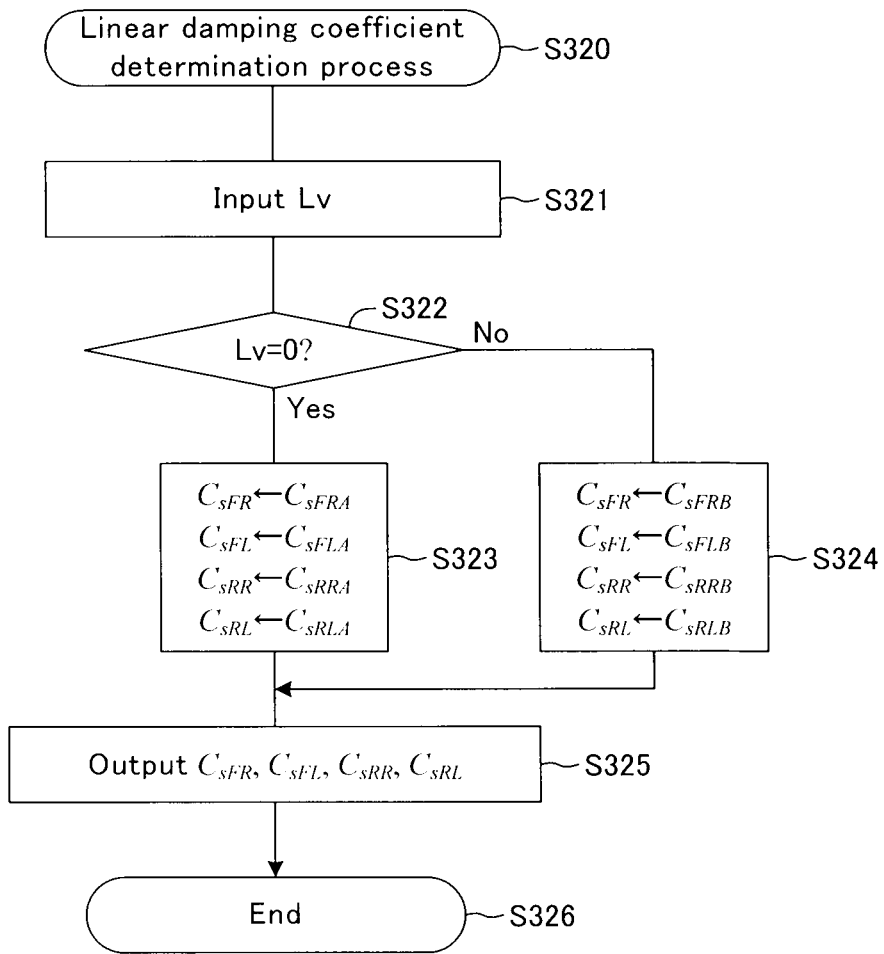
FIG. 22 is a flowchart illustrating the flow of a linear damping coefficient determination process executed by a linear damping coefficient determination section according to the third embodiment.

FIG. 22 is a flowchart illustrating the flow of a process executed by the linear damping coefficient determination section 252. The linear damping coefficient determination section 252 commences the linear damping coefficient determination process illustrated in FIG. 22 at S320. Then, in S321, the intermediate frequency input level Lv is inputted. Next, in S322, it is determined whether or not the inputted level Lv is 0. In the case where Lv is 0 (S322: Yes), or in other words, in the case where the intermediate frequency sprung acceleration is low or no intermediate frequency sprung acceleration is inputted, the process advances to S323. However, in the case where Lv is 1 (S322: No), or in other words, in the case where the intermediate frequency sprung acceleration is high, the process advances to S324.

The linear damping coefficient determination section 252 determines the linear damping coefficients $C_{sFR}$, $C_{sFL}$, $C_{sRR}$, and $C_{sRL}$ in S323 or S324. In S323, the linear damping coefficients $C_{sFR}$, $C_{sFL}$, $C_{sRR}$, and $C_{sRL}$ are set to respective coefficients $C_{sFRA}$, $C_{sFLA}$, $C_{sRRA}$, and $C_{sRLA}$. However, in S324, the linear damping coefficients $C_{sFR}$, $C_{sFL}$, $C_{sRR}$, and $C_{sRL}$ are set to respective coefficients $C_{sFRB}$, $C_{sFLB}$, $C_{sRRB}$, and $C_{sRLB}$. In other words, the magnitude of the determined linear damping coefficient differs depending on the intermediate frequency input level Lv. The various coefficients set for the linear damping coefficients are set in advance so as to have the relationship indicated in the following Equation (eq. 22).

$$\begin{cases} C_{sFRA} > C_{sFRB} \\ C_{sFLA} > C_{sFLB} \\ C_{sRRA} > C_{sRRB} \\ C_{sRLA} > C_{sRLB} \end{cases} \quad \text{(eq. 22)}$$

As can be seen from the Equation (eq. 22), the linear damping coefficients $C_{sFRB}$, $C_{sFLB}$, $C_{sRRB}$, and $C_{sRLB}$ set when Lv is 1, or in other words, when the intermediate frequency sprung acceleration is high, are lower than the linear damping coefficients $C_{sFRA}$, $C_{sFLA}$, $C_{sRRA}$, and $C_{sRLA}$ set when Lv is 0, or in other words, when the intermediate frequency sprung acceleration is low. In other words, the linear damping coefficients are set so as to decrease as the intermediate frequency sprung accelerations increase.

After determining the linear damping coefficients $C_{sFR}$, $C_{sFL}$, $C_{sRR}$, and $C_{sRL}$ in S323 or S324, the linear damping coefficient determination section 252 advances to S325, and outputs the determined linear damping coefficients $C_{sFR}$, $C_{sFL}$, $C_{sRR}$, and $C_{sRL}$. The process then advances to S326, and ends.

Figure 23:
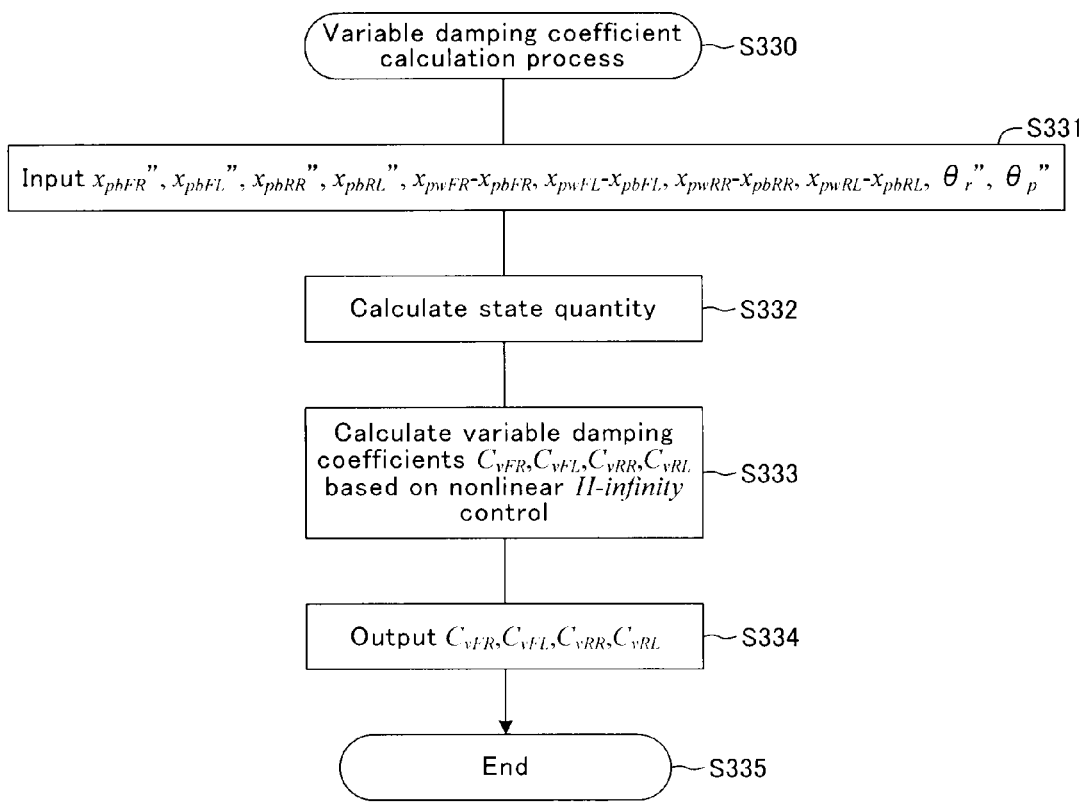
FIG. 23 is a flowchart illustrating the flow of a variable damping coefficient calculation process executed by a variable damping coefficient calculation section according to the third embodiment.

FIG. 23 is a flowchart illustrating the flow of a process executed by the variable damping coefficient calculation section 254. The variable damping coefficient calculation section 254 commences the variable damping coefficient calculation process illustrated in FIG. 23 at S330. Then, in S331, the sprung accelerations $x_{pbFR}''$, $x_{pbFL}''$, $x_{pbRR}''$, and $x_{pbRL}''$ are inputted from the respective sprung acceleration sensors $41_{FR}$, $41_{FL}$, $41_{RR}$, and $41_{RL}$, the sprung-unsprung relative displacement amounts $x_{pwFR}-x_{pbFR}$, $x_{pwFL}-x_{pbFL}$, $x_{pwRR}-x_{pbRR}$, and $x_{pwRL}-x_{pbRL}$ are inputted from the respective stroke sensors $43_{FR}$, $43_{FL}$, $43_{RR}$, and $43_{RL}$, the roll angle acceleration $\theta_r''$ is inputted from the roll angle acceleration sensor 45, and the pitch angle acceleration $\theta_p''$ is inputted from the pitch angle acceleration sensor 46.

Then, in S332, state quantities are computed. Here, the quantities to be controlled and the quantities necessary to be calculated are computed, such as a roll angle displacement amount $\theta_r$, a roll angle displacement speed $\theta_r'$, a pitch angle displacement amount $\theta_p$, a pitch angle displacement speed $\theta_p'$, the sprung displacement amounts $x_{pbFR}$, $x_{pbFL}$, $x_{pbRR}$, and $x_{pbRL}$, sprung displacement speeds $x_{pbFR}'$, $x_{pbFL}'$, $x_{pbRR}'$, and $x_{pbRL}'$, sprung-unsprung relative speeds $x_{pwFR}'-x_{pbFR}'$, $x_{pwFL}'-x_{pbFL}'$, $x_{pwRR}'-x_{pbRR}'$, and $x_{pwRL}'-x_{pbRL}'$, jerk (acceleration change rate), a heave acceleration $x_h''$, and so on. Note that the heave acceleration $x_h''$ is the vertical acceleration of the sprung member HA at a control target location, and can be estimated from sprung accelerations $x_{pbFR}''$, $x_{pbFL}''$, $x_{pbRR}''$, and $x_{pbRL}''$ at the positions at which the respective suspension apparatuses are attached.

Next, the variable damping coefficient calculation section 254 advances to S333, and calculates the variable damping coefficients $C_{vFR}$, $C_{vFL}$, $C_{vRR}$, and $C_{vRL}$ for the variable damping forces to be generated by the dampers in the four respective suspension apparatuses $SP_{FR}$, $SP_{FL}$, $SP_{RR}$, and $SP_{RL}$ so that vibrations in the sprung member HA at the control target location caused by heave motion (vertical motion), roll motion, and pitch motion in the sprung member HA are dampened, by applying the nonlinear H-infinity control to the control system designed based upon the motion of the four suspension apparatuses $SP_{FR}$, $SP_{FL}$, $SP_{RR}$, and $SP_{RL}$ attached to the sprung member HA. In this case, the equations (eq. 23), (eq. 24), and (eq. 25) are used for the motion equations used in the state space representation of the control system. (eq. 23) is the equation of heave motion of the sprung member HA. (eq. 24) is the equation of roll motion of the sprung member HA. (eq. 25) is the equation of pitch motion of the sprung member HA.

$$\begin{cases} M_b x_h'' = F_{FR} + F_{FL} + F_{RR} + F_{RL} & \text{(eq. 23)} \\ 2I_r \theta_r'' = T_f F_{FR} - T_f F_{FL} + T_r F_{RR} - T_r F_{RL} & \text{(eq. 24)} \\ I_p \theta_p'' = LF_{FR} + LF_{FL} - LF_{RR} - LF_{RL} & \text{(eq. 25)} \end{cases}$$

Here, $M_b$ represents the sprung member mass, $T_f$ represents the tread (front side), $T_r$ represents the tread (rear side), $I_r$ represents the roll inertia momentum, $I_p$ represents the pitch inertia momentum, and L represents the wheelbase.

The aforementioned Equation (eq. 24) and Equation (eq. 25) are motion equations derived when the control target location is a center of gravity of the sprung member HA. Furthermore, in the aforementioned Equation (eq. 23) through Equation (eq. 25), $F_{FR}$ represents a force working vertically at the right-front location of the sprung member HA, $F_{FL}$ represents a force working vertically at the left-front location of the sprung member HA, $F_{RR}$ represents a force working vertically at the right-rear location of the sprung member HA, and $F_{RL}$ represents a force working vertically at the left-rear location of the sprung member HA. These vertical forces are expressed through the following Equation (eq. 26) through Equation (eq. 29).

$$F_{FR} = K_{FR}(x_{pwFR} - x_{pbFR}) + C_{sFR}(x_{pwFR}' - x_{pbFR}') + C_{vFR}(x_{pwFR}' - x_{pbFR}') \quad (eq. 26)$$

$$F_{FL} = K_{FL}(x_{pwFL} - x_{pbFL}) + C_{sFL}(x_{pwFL}' - x_{pbFL}') + C_{vFL}(x_{pwFL}' - x_{pbFL}') \quad (eq. 27)$$

$$F_{RR} = K_{RR}(x_{pwRR} - x_{pbRR}) + C_{sRR}(x_{pwRR}' - x_{pbRR}') + C_{vRR}(x_{pwRR}' - x_{pbRR}') \quad (eq. 28)$$

$$F_{RL} = K_{RL}(x_{pwRL} - x_{pbRL}) + C_{sRL}(x_{pwRL}' - x_{pbRL}') + C_{vRL}(x_{pwRL}' - x_{pbRL}') \quad (eq. 29)$$

In the aforementioned Equation (eq. 26) through Equation (eq. 29), $K_{FR}$ represents the spring constant of the spring in the suspension apparatus $SP_{FR}$, $K_{FL}$ represents the spring constant of the spring in the suspension apparatus $SP_{FL}$, $K_{RR}$ represents the spring constant of the spring in the suspension apparatus $SP_{RR}$, and $K_{RL}$ represents the spring constant of the spring in the suspension apparatus $SP_{RL}$.

The state space representation of a generalized plant that serves as a bilinear system is derived from the aforementioned Equation (eq. 23) through Equation (eq. 25). The derived state space representation is written as indicated in the following Equation (eq. 30).

$$\begin{cases} x' = Ax + B(x)u \\ z = Cx + Du \end{cases} \quad (eq. 30)$$

In the aforementioned Equation (eq. 30), x represents a state quantity, z represents an evaluation output, and u represents a control input. The control input u is a variable damping coefficient for the dampers of the respective suspension apparatuses, as indicated in the following Equation (eq. 31).

$$u = \begin{bmatrix} C_{vFR} \\ C_{vFL} \\ C_{vRR} \\ C_{vRL} \end{bmatrix} \quad (eq. 31)$$

Because Equation (eq. 30) represents a bilinear system, the control input u can be calculated by solving the Riccati inequality in the same manner as in the aforementioned first embodiment. The respective variable damping coefficients are obtained from the calculated control input u. Details of the state quantity, the evaluation output, and the coefficient matrices will be omitted.

After the variable damping coefficients $C_{vFR}$, $C_{vFL}$, $C_{vRR}$, and $C_{vRL}$ have been calculated in the manner described above, the variable damping coefficient calculation section 254 advances to S334 and outputs the variable damping coefficients $C_{vFR}$, $C_{vFL}$, $C_{vRR}$, and $C_{vRL}$. The process then advances to S335, and ends.

Figure 24:
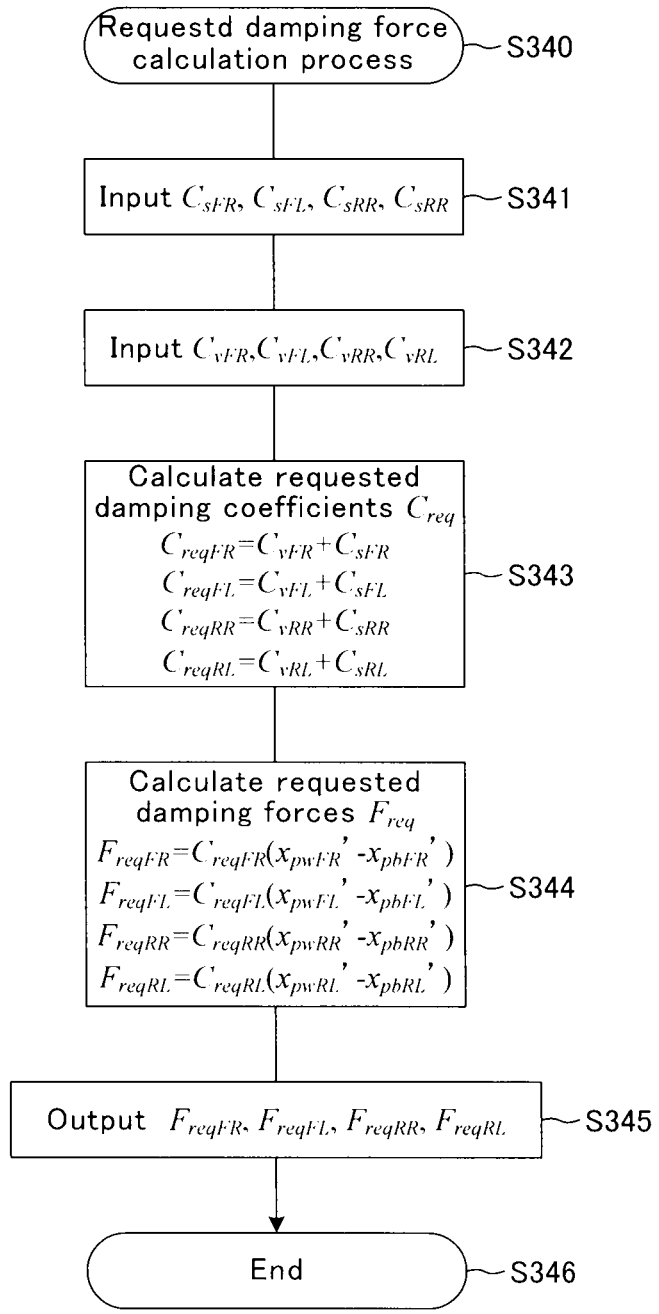
FIG. 24 is a flowchart illustrating the flow of a requested damping force calculation process executed by a requested damping force calculation section according to the third embodiment.

FIG. 24 is a flowchart illustrating the flow of a process executed by the requested damping force calculation section 255. The requested damping force calculation section 255 commences the requested damping force calculation process illustrated in this diagram at S340. Then, in S341, the linear damping coefficients $C_{sFR}$, $C_{sFL}$, $C_{sRR}$, and $C_{sRL}$ are inputted. Next, in S342, the variable damping coefficients $C_{vFR}$, $C_{vFL}$, $C_{vRR}$, and $C_{vRL}$ are inputted.

The requested damping force calculation section 255 then advances to S343, and calculates requested damping coefficients $C_{reqFR}$, $C_{reqFL}$, $C_{reqRR}$, and $C_{reqRL}$ by adding the variable damping coefficients to the linear damping coefficients, as indicated by the following Equation (eq. 32).

$$\begin{cases} C_{reqFR} = C_{vFR} + C_{sFR} \\ C_{reqFL} = C_{vFL} + C_{sFL} \\ C_{reqRR} = C_{vRR} + C_{sRR} \\ C_{reqRL} = C_{vRL} + C_{sRL} \end{cases} \quad (eq. 32)$$

Next, in S344, the requested damping forces $F_{reqFR}$, $F_{reqFL}$, $F_{reqRR}$, and $F_{reqRL}$, which are the control target damping forces, are calculated by multiplying the requested damping coefficients $C_{reqFR}$, $C_{reqFL}$, $C_{reqRR}$, and $C_{reqRL}$ with the sprung-unsprung relative speeds $x_{pwFR}' - x_{pbFR}'$, $x_{pwFL}' - x_{pbFL}'$, $x_{pwRR}' - x_{pbRR}'$, and $x_{pwRL}' - x_{pbRL}'$ that correspond to those respective requested damping coefficients. Then, in S345, the requested damping forces $F_{reqFR}$, $F_{reqFL}$, $F_{reqRR}$, and $F_{reqRL}$ are outputted. The process then advances to S346, and ends.

Figure 25:
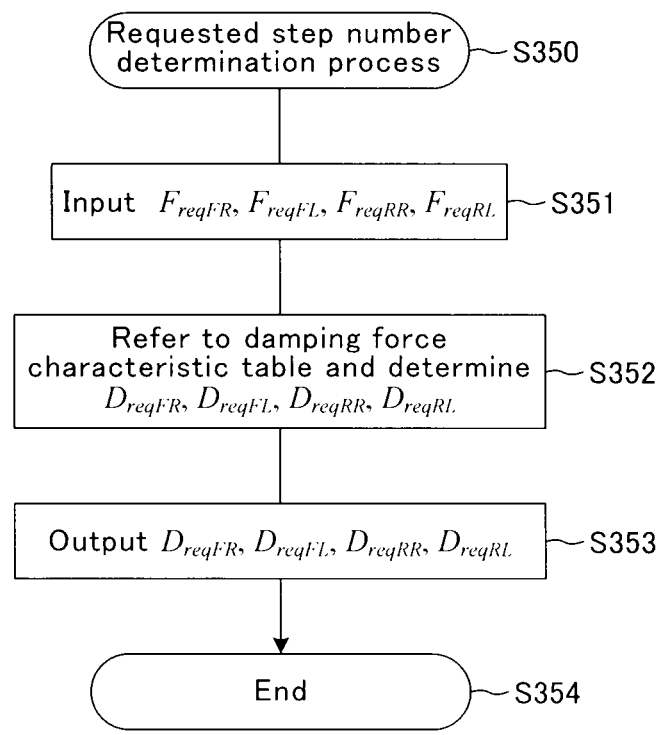
FIG. 25 is a flowchart illustrating the flow of a requested step number determination process executed by a requested step number determination section according to the third embodiment.

FIG. 25 is a flowchart illustrating the flow of a process executed by the requested step number determination section 256. The requested step number determination section 256 commences the requested step number determination process illustrated in the diagram at S350. Then, in S351, the requested damping forces $F_{reqFR}$, $F_{reqFL}$, $F_{reqRR}$, and $F_{reqRL}$ are inputted. Next, in S352, the requested step numbers $D_{reqFR}$, $D_{reqFL}$, $D_{reqRR}$, and $D_{reqRL}$ are determined for each damper in the respective suspension apparatuses $SP_{FR}$, $SP_{FL}$, $SP_{RR}$, and $SP_{RL}$ by referring to the damping force characteristic table. Then, in S353, the determined requested step numbers $D_{reqFR}$, $D_{reqFL}$, $D_{reqRR}$, and $D_{reqRL}$ are outputted. The process then advances to S354, and ends. The actuators $32_{FR}$, $32_{FL}$, $32_{RR}$, and $32_{RL}$ take the respective requested step numbers as inputs, and control the valves so that the step number expressing the damping force characteristic of the corresponding damper is equal to the inputted requested step number. In this manner the damping forces of the suspension apparatuses $SP_{FR}$, $SP_{FL}$, $SP_{RR}$, and $SP_{RL}$ are controlled simultaneously.

In the third embodiment, the linear damping coefficient set when the intermediate frequency input level Lv is 1, or in other words, when the intermediate frequency sprung acceleration is high, is lower than the linear damping coefficient set when the intermediate frequency input level Lv is 0, or in other words, when the intermediate frequency sprung acceleration is low. In other words, the linear damping coefficient is set so as to decrease as the intermediate frequency sprung acceleration increases. Therefore, when the intermediate frequency sprung acceleration is high, the requested damping force is lower than when the intermediate frequency sprung acceleration is low. This suppresses degradation in the riding quality. Furthermore, the requested damping force is greater when the intermediate frequency sprung acceleration is low or the intermediate frequency sprung acceleration is not inputted than when the intermediate frequency sprung acceleration is high. This quickly dampens vibrations in the sprung member HA.

Furthermore, according to the third embodiment, vibrations in the control target location of the sprung member HA are dampened having taken into consideration the heave motion, roll motion, and pitch motion of the sprung member HA. Therefore, the riding quality at the control target location is improved. In addition, the heave motion, roll motion, and pitch motion of the sprung member HA are taken into consideration when the variable damping coefficient is calculated based on the nonlinear H-infinity control. Thus, the overall damping control for vibrations in the control target location of the sprung member HA caused by these motions is performed by controlling the magnitude of the variable damping forces generated by the dampers in the respective suspension apparatuses. Meanwhile, the influence of the intermediate frequency sprung acceleration is taken into consideration when determining the magnitude of the linear damping coefficient. Thus, the damping control for suppressing a degradation in the riding quality when the intermediate frequency sprung acceleration is inputted is performed by controlling the magnitude of the linear damping forces generated by the dampers in the respective suspension apparatuses. In other words, overall damping control of vibrations in the sprung member HA is performed by controlling the variable damping force, and a degradation in the riding quality when the intermediate frequency sprung acceleration vibrations are inputted is suppressed by adjusting the magnitude of the linear damping force. Therefore, the damping force control achieves both an overall damping of the vibrations in the sprung member HA and the suppression of degradation in the riding quality when intermediate frequency sprung acceleration vibrations are inputted.

Figure 26:
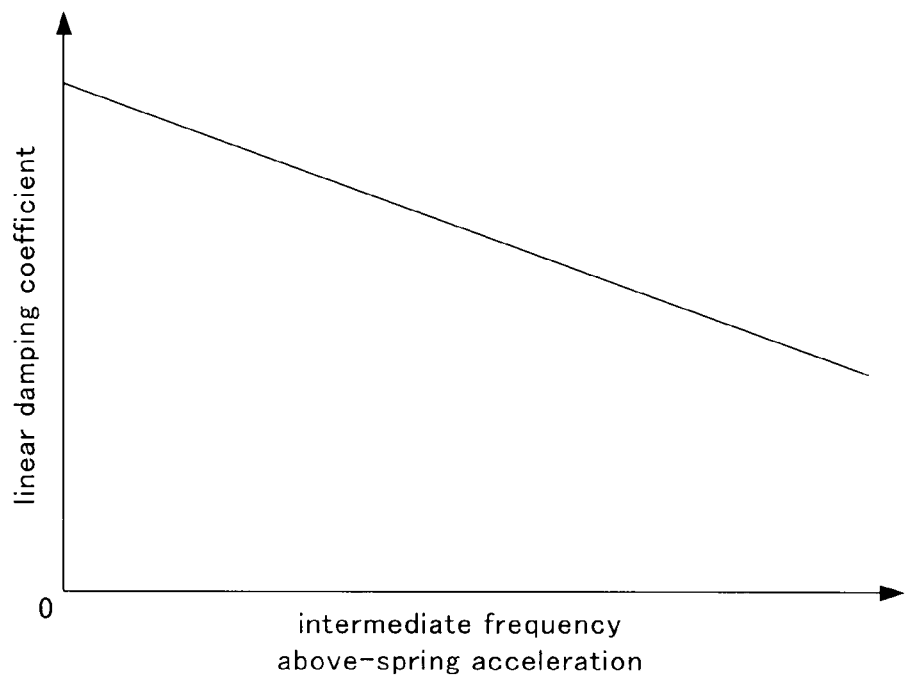
FIG. 26 is a graph illustrating another example for determining the linear damping coefficient in accordance with an intermediate frequency sprung acceleration.
Figure 27:
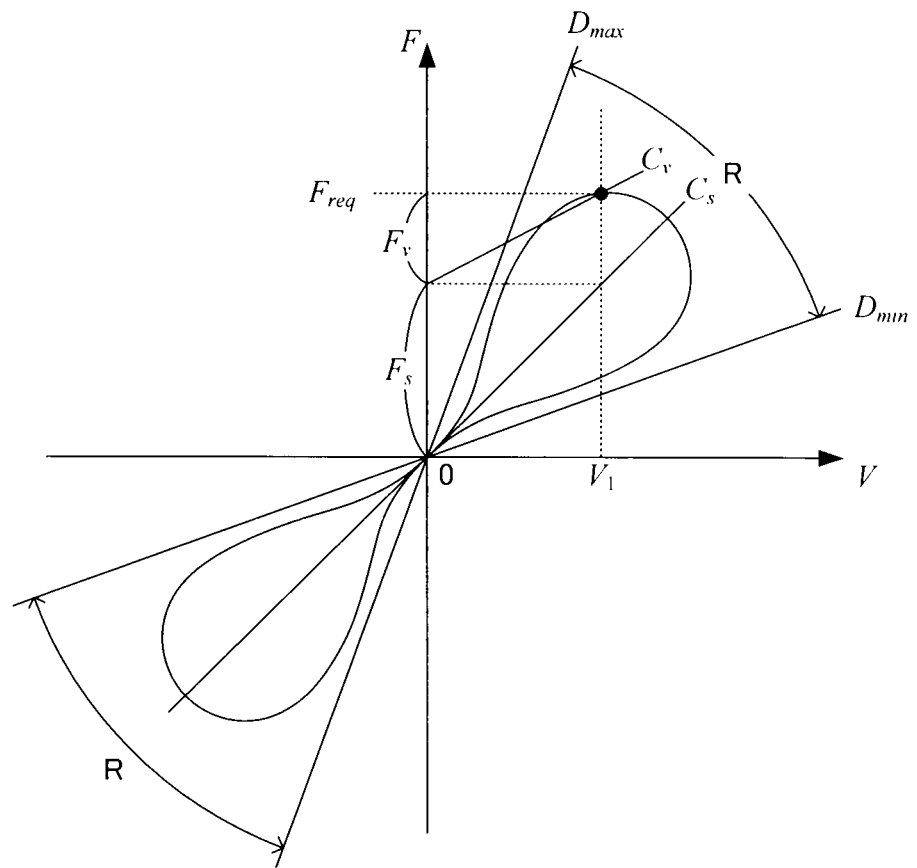
FIG. 27 is a damping force characteristic graph illustrating transition in the requested damping force found by applying a nonlinear H-infinity control theory.

In the third embodiment, the intermediate frequency input level Lv is set to 0 when the vibrations having the frequency within the intermediate frequency band are low, and intermediate frequency input level Lv is set to 1 when the vibrations having the frequency within the intermediate frequency band are high. The linear damping coefficient is then determined, based on the intermediate frequency input level Lv set in this dual-stage manner, so that the linear damping coefficient is lower the greater the vibrations in the intermediate frequency band are. Aside from this determination method, a method may also be employed where, for example, the intermediate frequency input level Lv is set from 1 to 5 in accordance with the magnitude of the maximum amplitude value of the intermediate frequency sprung acceleration, and the linear damping coefficients are determined so as to decrease as the vibrations in the intermediate frequency band increase, based on the level set in this multi-stage manner. Alternatively, for example, the linear damping coefficients may be determined so as to decrease as the intermediate frequency sprung acceleration increases by referring to a graph expressing a relationship between the magnitude of the intermediate frequency sprung acceleration and the linear damping coefficient, as shown in FIG. 26. In the case where the relationship between the intermediate frequency sprung acceleration and the linear damping coefficient is expressed as a function, the linear damping coefficients may be determined using that function. Here, the function may be expressed as a linear expression, or may be expressed as a function that incorporates the saturation characteristics of the linear damping coefficient. In other words, any method for determining the linear damping coefficient may be employed as long as the linear damping coefficient decreases as the vibrations in the intermediate frequency band increase.

Although the foregoing has described embodiments of the present invention, the present invention is not to be interpreted as being limited by the aforementioned embodiments in any way. For example, although the aforementioned first embodiment describes an example in which the magnitude of vibrations in the intermediate frequency band is determined based on the maximum amplitude value α of the intermediate frequency sprung acceleration, the maximum value of the absolute value of the intermediate frequency sprung acceleration or the like may be used instead. Furthermore, although the requested damping force is brought within the range of variation for the damping force characteristic of the damper when the Lissajous curve expressing the transition of the requested damping force drops below the lower limit of the damping force characteristic in the aforementioned embodiments, the requested damping force may also be brought within the range of variation for the damping force characteristic of the damper when the Lissajous curve expressing the transition of the requested damping force exceeds the upper limit of the damping force characteristic. In this manner, the present invention may be varied as long as such variations do not depart from the scope of the present invention.

The invention claimed is:

1. A damping force control apparatus that controls a damping force for a vibration in a suspension apparatus including a damper and a spring interposed between a sprung member and an unsprung member, the damping force control apparatus comprising:
   a nonlinear weight determination means for determining a magnitude of a nonlinear weight that is set when a nonlinear H-infinity control theory is applied to a control system designed based on the motion of the suspension apparatus;
   a variable damping coefficient calculation means for calculating a variable damping coefficient which is a coefficient of a variable damping force to be generated by the damper relative to a vibration speed by applying the nonlinear H-infinity control theory to the control system in which the nonlinear weight determined by the nonlinear weight determination means has been set;
   a linear damping coefficient determination means for determining a linear damping coefficient which is a coefficient of a linear damping force to be generated by the damper relative to the vibration speed based on a magnitude of a vibration in the sprung member having a frequency within a specific frequency band determined in advance as a frequency band that is greater than a sprung member resonation frequency;
   a requested damping force calculation means for calculating a requested damping force which is a target damping force generated by the damper based on the variable damping coefficient and the linear damping coefficient; and
   a damping force characteristic control means for controlling a damping force characteristic of the damper based on the requested damping force,
   wherein the nonlinear weight determination means determines the magnitude of the nonlinear weight based on the magnitude of the linear damping coefficient determined by the linear damping coefficient determination means so that the requested damping force corresponds to a damping force that is within a range of variation for the damping force characteristic of the damper.

2. The damping force control apparatus according to claim 1, wherein the linear damping coefficient determination means determines the linear damping coefficient so as to decrease as an acceleration of the vibration in the sprung member having the frequency within the specific frequency band increases.

3. The damping force control apparatus according to claim 1,
   wherein the specific frequency band is an intermediate frequency band that is greater than the sprung member resonation frequency and less than an unsprung member resonation frequency.

4. The damping force control apparatus according to claim 1, wherein the nonlinear weight determination means determines the nonlinear weight so as to decrease as the linear damping coefficient determined by the linear damping coefficient determination means decreases.

5. A damping force control apparatus that controls a damping for a vibration in a suspension apparatus including a damper and a spring interposed between a sprung member and an unsprung member, the damping force control apparatus comprising:
- a variable damping coefficient calculation means for calculating a variable damping coefficient which is a coefficient of a variable damping force to be generated by the damper relative to a vibration speed by applying a nonlinear H-infinity control theory to a control system designed based on the motion of the suspension apparatus;
- a linear damping coefficient determination means for determining a linear damping coefficient which is a coefficient of a linear damping force to be generated by the damper relative to the vibration speed based on a magnitude of a vibration in the sprung member having a frequency within a specific frequency band determined in advance as a frequency band that is greater than a sprung member resonation frequency;
- a requested damping force calculation means for calculating a requested damping force which is a target damping force generated by the damper based on the variable damping coefficient and the linear damping coefficient;
- a corrected requested damping force calculation means for calculating a corrected requested damping force by correcting the requested damping force based on the magnitude of the linear damping coefficient determined by the linear damping coefficient determination means; and
- a damping force characteristic control means for controlling a damping force characteristic of the damper based on the corrected requested damping force,
wherein the corrected requested damping force calculation means calculates the corrected requested damping force so that the corrected requested damping force corresponds to a damping force within a range of variation for the damping force characteristic of the damper.

6. The damping force control apparatus according to claim 5, wherein the corrected requested damping force calculation means calculates the corrected requested damping force when the linear damping coefficient determined by the linear damping coefficient determination means is less than a predetermined reference linear damping coefficient.

7. The damping force control apparatus according to claim 6, wherein when the linear damping coefficient determined by the linear damping coefficient determination means is less than the reference linear damping coefficient, the corrected requested damping force calculation means calculates the corrected requested damping force based on a differential damping ratio, the differential damping ratio being a ratio of a reference damping force difference that is the difference between a reference linear damping force calculated by multiplying the reference linear damping coefficient by a vibration speed and a minimum damping force generated by the damper at that vibration speed, to a comparative damping force difference that is the difference between a linear damping force calculated by multiplying the linear damping coefficient determined by the linear damping coefficient determination means by a vibration speed and the minimum damping force.

8. The damping force control apparatus according to claim 7, wherein the corrected requested damping force calculation means calculates the corrected requested damping force $F_{req}^*$ through the following equation:

$$F_{req}^* = F_s - G(F_{s0} - F_{req0}),$$

where $F_{req0}$ represents a reference requested damping force that is a requested damping force calculated using the reference linear damping coefficient, G represents the differential damping ratio, $F_{s0}$ represents the reference linear damping force, and $F_s$ represents the linear damping force.

9. The damping force control apparatus according to claim 5, wherein the linear damping coefficient determination means determines the linear damping coefficient so as to decrease as an acceleration of the vibration in the sprung member having the frequency within the specific frequency band increases.

10. The damping force control apparatus according to claim 5, wherein the specific frequency band is an intermediate frequency band that is greater than the sprung member resonation frequency and less than an unsprung member resonation frequency.

* * * * *